(12) United States Patent
McClanahan et al.

(10) Patent No.: US 8,404,013 B2
(45) Date of Patent: Mar. 26, 2013

(54) FUEL GAS CONDITIONING SYSTEM WITH CROSS HEAT EXCHANGER

(75) Inventors: Jack L. McClanahan, Montgomery, TX (US); Craig S. Tiras, Houston, TX (US)

(73) Assignee: Gaumer Company, Inc., Houston, TX (US)

( * ) Notice: Subject to any disclaimer, the term of this patent is extended or adjusted under 35 U.S.C. 154(b) by 563 days.

(21) Appl. No.: 12/553,823

(22) Filed: Sep. 3, 2009

(65) Prior Publication Data

US 2010/0170210 A1    Jul. 8, 2010

Related U.S. Application Data

(63) Continuation-in-part of application No. 12/399,811, filed on Mar. 6, 2009, now Pat. No. 8,103,156, which is a continuation-in-part of application No. 12/029,957, filed on Feb. 12, 2008, now abandoned.

(60) Provisional application No. 60/889,324, filed on Feb. 12, 2007.

(51) Int. Cl.
*B01D 46/00* (2006.01)

(52) U.S. Cl. ............... 55/385.1; 55/434.4; 55/490.1; 392/485; 392/488

(58) Field of Classification Search ............ 55/428.1, 55/434.2, 434.4, 385.1, 490.1; 392/485, 392/486, 488

See application file for complete search history.

(56) References Cited

U.S. PATENT DOCUMENTS

| | | | |
|---|---|---|---|
| 3,726,713 | A | 4/1973 | Hawk et al. |
| 3,871,734 | A | 3/1975 | Murtland |
| 4,781,607 | A | 11/1988 | Rumbaugh |
| 4,895,528 | A | 1/1990 | Choiniere et al. |
| 5,070,940 | A | 12/1991 | Conner et al. |
| 5,396,574 | A | 3/1995 | Base et al. |
| 5,400,432 | A * | 3/1995 | Kager et al. ............ 392/492 |
| 5,577,925 | A | 11/1996 | Schnatzmeyer et al. |
| 6,145,597 | A | 11/2000 | Kobylinski |
| 6,246,831 | B1 * | 6/2001 | Seitz et al. ............ 392/486 |
| 6,364,933 | B1 | 4/2002 | Heath |
| 6,551,379 | B2 | 4/2003 | Heath |
| 6,592,641 | B2 | 7/2003 | Alvin et al. |
| 6,994,589 | B2 | 2/2006 | Schliese |
| 7,204,724 | B2 | 4/2007 | Holtz |
| 7,442,239 | B2 | 10/2008 | Armstrong et al. |

* cited by examiner

*Primary Examiner* — Robert Clemente
(74) *Attorney, Agent, or Firm* — Bracewell & Giuliani LLP

(57) ABSTRACT

A feed gas conditioner can include embodiments having a cross heat exchanger. In embodiments, the cross heat exchanger can have a housing defining a flow passage in a first direction and a flow passage in a second direction. Heating elements in the flow passage in the first direction can heat fluidic materials. In embodiments, the feed gas conditioner can remove particles from the fluidic materials.

6 Claims, 11 Drawing Sheets

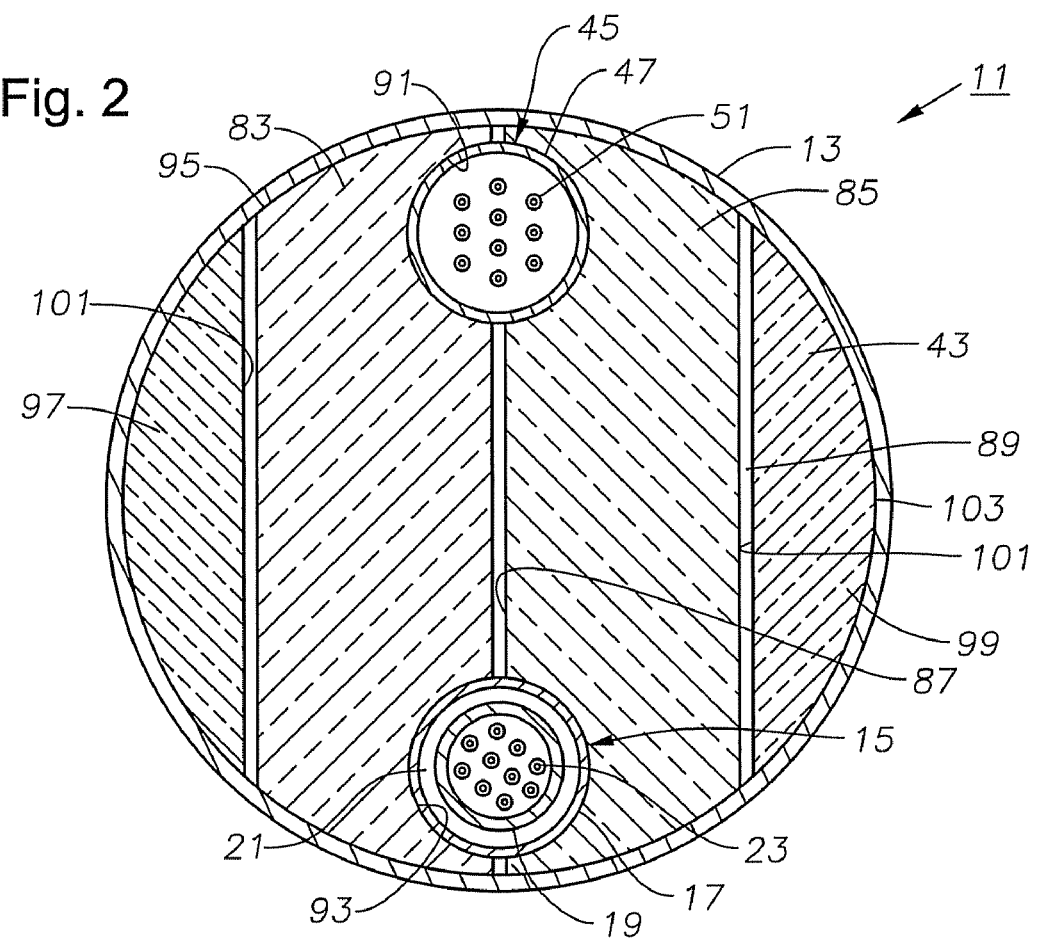

US 8,404,013 B2

FUEL GAS CONDITIONING SYSTEM WITH CROSS HEAT EXCHANGER

CROSS-REFERENCE TO RELATED APPLICATIONS

This application is a continuation in part of U.S. utility patent application Ser. No. 12/399,811, filed on Mar. 6, 2009 now U.S. Pat. No. 8,103,156, which was a continuation in part of U.S. utility patent application Ser. No. 12/029,957, filed on Feb. 12, 2008 now abandoned, which claimed priority to U.S. provisional patent application Ser. No. 60/889,324, filed on Feb. 12, 2007, the disclosures of which are incorporated herein by reference.

This application is related to U.S. utility patent application Ser. No. 12/553,808, filed on Sep. 3, 2009.

FIELD OF THE INVENTION

This invention relates in general to an apparatus for converting a natural gas from a feed line to a superheated, clean and dry fuel gas for a gas turbine.

BACKGROUND OF THE INVENTION

Gas turbines are normally supplied with a dry gas that is superheated a selected level above its due point. The super heat avoids any liquids in the gas condensing as the pressure drops.

A typical conditioning system is made up of several pieces of equipment connected together by flowlines. This equipment may include a pre-heater to pre-heat the feed gas flowing into the system. An expansion valve is located in a flowline leading from the pre-heater to a gas scrubber. The expansion valve drops the temperature below the dew point of the gas. Typically, the gas scrubber comprises a cylindrical pressure vessel oriented upright, with the inlet at a lower portion and the outlet at an upper end. A coalescing filter is located between the inlet and the outlet for removing the condensate as the gas flows through. The gas flows then to a super heater, which heats the gas to a desired temperature above the dew point. The gas then flows through another filter to the gas turbine.

While this system works well, it takes up considerable space. Some facilities may lack adequate space. Also, the separate pieces of equipment add to the cost.

SUMMARY

According to one aspect of the invention, an apparatus for conditioning feed gas has been provided that includes an outer tubular housing; an inner tubular housing that defines a passageway positioned within the outer tubular housing, wherein an end of the passageway is adapted to be operably coupled to an outlet stream of fluidic materials; a plurality of spaced apart baffles positioned within the passageway of the inner tubular housing, wherein each baffle defines at least one passageway; one or more heating elements positioned within the passageway of the inner tubular housing, wherein each heating element extends through a corresponding passageway in each of the baffles; and an annular passageway defined between the inner and outer tubular housings, wherein an inlet of the annular passageway is adapted to be operably coupled to an input stream of fluidic material, and wherein an outlet of the annular passageway is operably coupled to another end of the passageway of the inner tubular housing.

According to another aspect of the present invention, a method for conditioning feed gas has been provided that includes feeding an inlet stream of gas into an outer passageway in a first direction; then feeding the inlet stream of gas into an inner passageway in a second direction, in opposition to the first direction; heating the inlet stream of gas within the inner passageway; and impeding the flow of the inlet stream of gas within the inner passageway.

According to another aspect of the present invention, a system for conditioning feed gas has been provided that includes means for feeding an inlet stream of gas into an outer passageway in a first direction; means for then feeding the inlet stream of gas into an inner passageway in a second direction, in opposition to the first direction; means for heating the inlet stream of gas within the inner passageway; and means for impeding the flow of the inlet stream of gas within the inner passageway.

BRIEF DESCRIPTION OF THE DRAWINGS

FIG. 2 is a sectional view of the apparatus of FIG. 1 taken along the line 2-2 of FIG. 1.

FIG. 3 is a sectional view of a portion of an alternate embodiment of an apparatus in accordance with an exemplary embodiment of the invention.

DETAILED DESCRIPTION OF THE INVENTION

Figure 1:
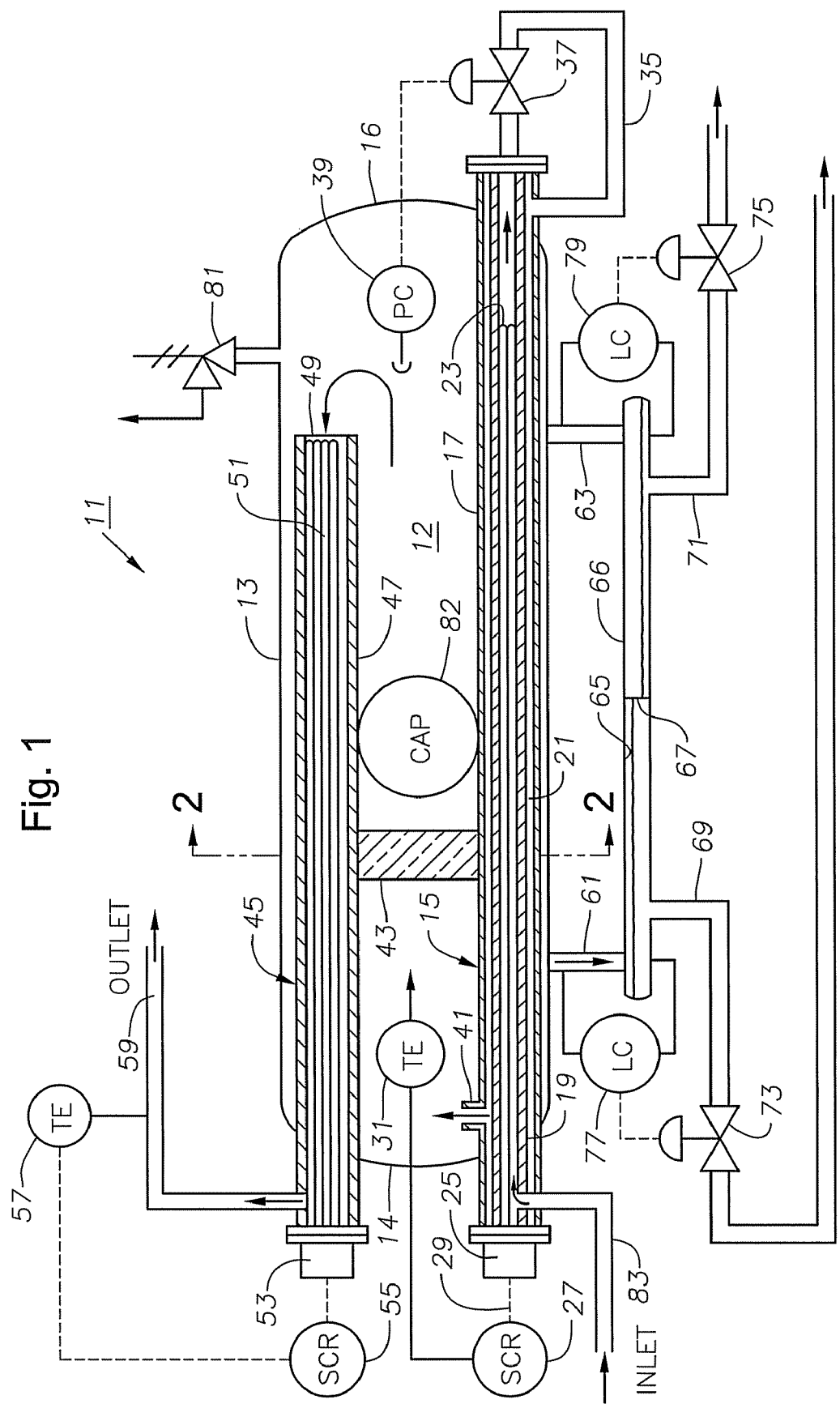
FIG. 1 is a schematic sectional view of an apparatus constructed in accordance with an exemplary embodiment of the invention.

Referring to FIG. 1, fuel gas conditioning system 11 includes a pressure vessel 13 having an interior chamber 12. Pressure vessel 13 is preferably cylindrical and has two closed ends 14, 16. The length of pressure vessel 13 considerably greater than its diameter. In this example, the longitudinal axis of pressure vessel 13 is horizontal.

A pre-heater unit 15 is mounted in pressure vessel 13 with its axis parallel and offset from the longitudinal axis of pressure vessel 13. Pre-heater unit 15 has a length somewhat greater than the length of pressure vessel 13 in this example, with its ends protruding past ends 14, 16 of pressure vessel 13. Pre-heater unit 15 has an outer tubular housing 17 and a concentric inner tubular housing 19, defining an annulus 21 between housings 17, 19. A plurality of electrical heater elements 23 extend longitudinally within inner housing 19.

Heater elements 23 are conventional elements, each comprising a metal tube containing an electrical resistance wire electrically insulated from the tube. In this embodiment, heater elements 23 are U-shaped, each having its terminal ends mounted within a connector housing 25 located exterior of end 14 of pressure vessel 13. The bent portions of heater elements 23 are located near the opposite end of pre-heater unit 15. A power controller 27 supplies power via wires 29 to electrical heater elements 23. Power controller 27 varies the power in response to temperature sensed by a temperature sensor 31 that is located within chamber 12 in pressure vessel 13.

Pre-heater unit 15 has an inlet 33 that leads to the interior of inner housing 19 of pre-heater unit 15 in the portion of pre-heater unit 15 exterior of pressure vessel end 14. In the embodiment of FIG. 1, an external conduit loop 35 is located on the opposite end of pre-heater unit 15, exterior of pressure vessel end 16. External loop 35 leads from the interior of inner housing 19 to annulus 21. A variable expansion valve 37 is located in external loop 35 for reducing the pressure of the gas flowing through external loop 35, which also results in cooling of the gas. Expansion valve 37 varies the amount of pressure drop in response to a pressure sensor 39 located within pressure vessel chamber 12.

Annulus 21 has an outlet 41 located within pressure vessel chamber 12 near end 14. A mist or coalescing filter 43 is located within pressure vessel chamber 12 approximately halfway between ends 14, 16 of pressure vessel 13. Coalescing filter 43 collects liquid mist from the gas flowing from annulus outlet 41 towards the pressure vessel end 16.

A super-heater 45 is mounted in pressure vessel chamber 12. Super-heater 45 has an elongated tubular housing 47 that has an axis parallel with the axis of pre-heater unit 15 and offset from the axis of pressure vessel 13. Super-heater 45 is located above pre-heater unit 15 in this example and has a length that is less than the length of pre-heater unit 15. Super-heater 45 has an inlet 49 in housing 47, inlet 49 being within pressure vessel chamber 12 and closer to pressure vessel end 16 than end 14. Super-heater 45 has a plurality of electrical resistance heater elements 51 located within housing 47.

Electrical resistance heater elements 51 may be of the same type as electrical resistance heater elements 23 of pre-heater unit 15. Preferably, each is U-shaped with both of its terminal ends mounted within an a connector housing 53, which is external of end 14 of pressure vessel 13. A power controller 55 supplies power to electrical resistance heater elements 51. Power controller 55 controls the power in response to temperature sensed by a temperature sensor 57 located within an outlet 59 of super-heater 45. In this embodiment, outlet 59 leads from a portion of super-heater housing 47 that is external of pressure vessel 13.

Pressure vessel 13 has at least one drain 61 for draining liquid that condenses within chamber 13 upstream of filter 43 as a result of the pressure drop. A second drain 63 drains liquid that separates from the gas as a result of flowing through filter 43. Drains 61, 63 are located on opposite sides of filter 43 and lead downward from a lower point on the sidewall of pressure vessel 13. Each drain 61, 63 leads to a separate sump 65, 66. In this example, sumps 65, 66 are compartments of a single tubular pressure vessel and separated from each other by a sealed plate 67. Outlets 69, 71 lead from the bottom of sumps 65, 66 to liquid control valves 73, 75. Each liquid control valve 73, 75 has a level controller 77, 79, respectively. Level controllers 77, 79 are conventional devices to open valves 73, 75 when the levels of liquid within sumps 65, 66 reach a selected amount, so as to discharge the liquid from sumps 65, 66. Other automatic drain arrangements are feasible.

Pressure vessel 13 has a pressure relief valve 81 in communication with its chamber 12. Pressure relief valve 81 is a conventional device to relieve pressure in the event that it reaches an excessive amount. Preferably, pressure vessel 13 has an access port 82 with a removable cap. Access port 82 is located in its sidewall in this embodiment. Access port 82 is of a size selected to allow a worker to enter chamber 12 for maintenance, particularly for removing and installing coalescing filter 43, which must be done periodically.

Referring to FIG. 2, coalescing filter 43 comprises an assembly of compressible pieces or segments that define an outer diameter that sealingly engages the inner diameter of pressure vessel 13. The multiple pieces of coalescing filter 43 are sized so that each will pass through access port 82 (FIG. 1). These pieces include in this example a pair of central segments 83, 85 having inner edges 87 and outer edges 89 that are straight and parallel with each other. Inner edges 87 sealingly abut each other. Each inner edge 87 has a semi-cylindrical recess 91 for engaging super-heater 45. Each inner edge 87 has a semi-cylindrical recess 93 for fitting around pre-heater unit 15. Each central segment 83, 85 has outer diameter portions 95 on opposite ends that are partially cylindrical and sealingly engage the inner diameter of pressure vessel 13.

Coalescing filter 43 also has two side segments 97, 99 in this embodiment. Each side segment 97, 99 has a straight inner edge 101 that abuts one of the outer edges 89 of one of the central segments 83, 85. Each side segment 97 has an outer diameter portion 103 that seals against the inner diameter of pressure vessel 13. Segments 83, 85, 97 and 99 are compressible so as to exert retentive forces against each other and against pressure vessel 13 to hold them in place. Retainers (not shown) may also be employed to hold the segments of coalescing filter 43 in position.

Fuel gas conditioning system 11 serves to condition fuel gas for gas turbines. Gas turbines, particularly low pollution types, require a dry feed gas that has a selected amount of superheat, such as 50 degrees above its dew point curve. The teen "superheat" is a conventional industry term to refer to a range where the pressure and temperature of the fuel gas are above a range where condensation can occur. Referring to FIG. 1, feed gas enters inlet 49 at a pressure that may be, for example, 1,000 to 1,300 psig and at a temperature from 60-80 degrees F. The feed gas flows through inner housing 19 of pre-heater unit 15, which increases the temperature of the feed gas a selected amount over the temperature of the incoming gas. For example, the temperature may be approximately 100-120 degrees F. as it exits inner housing 19, and the pressure would be approximately the same as at inlet 49.

This preheated gas then flows through expansion valve 37, causing a pressure drop to a selected level below the dew point curve, as monitored by pressure sensor 39. For example, if the intake pressure is 1,000 to 1,300 psig, the pressure may drop to approximately 450-500 psig. The temperature will also drop to perhaps 60-80 degrees F., and at this temperature and pressure, the gas will be below its dew point curve. The lower pressure cooler gas flows back through annulus 21 in pre-heater unit 15, which adds additional heat. At annulus outlet 41, the pressure may still be around 450-550 psig and the temperature may be 70-100 degrees F., but still below the dew point. Controller 27 controls the power to heater elements 23 to maintain a desired temperature at outlet 41 as monitored by sensor 31.

Because the drop in pressure at expansion valve 37 caused the gas to be below its dew point, some of the liquids contained within the gas will condense in chamber 14 upstream of filter 43. Also, liquids will be separated from the gas by coalescing filter 43 as the gas flows through coalescing filter 43. The liquids collect on the bottom of pressure vessel 13 and flow through outlets 61, 63 into sumps 65, 66 and out through valves 73, 75.

After passing through filter 43, the gas flows toward pressure vessel end 16 and enters inlet 49 of super-heater 45. Electrical resistance heater elements 51 add heat to the dry gas in an amount that will place the temperature of the gas well above its dew point curve, such as by 50 degrees. The gas, now in a superheated condition, flows out outlet 59 at for example 110-130 degrees F. and 450-550 psig. The gas from outlet 59 flows into a conventional gas turbine (not shown).

FIG. 3 shows a portion of an alternate embodiment wherein pressure vessel 105 contains an expansion valve 107 within its interior. In the first embodiment, expansion valve 37 is located on the exterior of pressure vessel 13. In FIG. 3, preheater inner housing 109 and outer housing 11 have one end within pressure vessel 105 instead of on the exterior as in the first embodiment. Heater elements 113 are contained within inner housing 109 as in the first embodiment. A valve actuator 115 controls the orifice of expansion valve 107. Valve actuator 115 varies the pressure drop in response to pressure sensed by a pressure sensor 117 located within the interior of pressure vessel 105. The second embodiment operates in the same manner as the first embodiment.

The gas conditioner is compact as the components are principally contained within a single pressure vessel. This arrangement reduces the amount of space required and the external flowlines connecting the various components.

Figure 4:
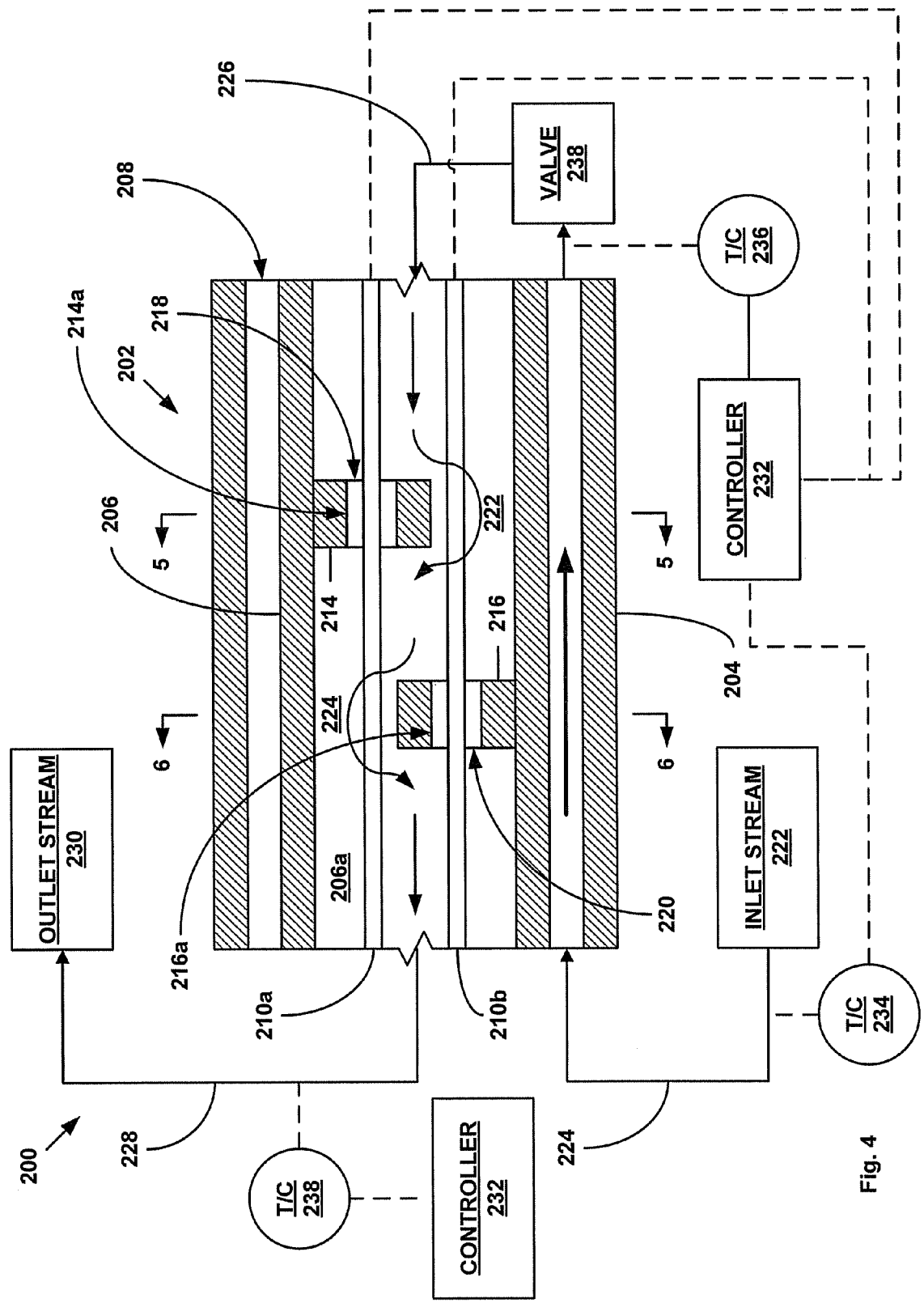
FIG. 4 is a fragmentary cross sectional and schematic illustration of an alternate exemplary embodiment of a fuel gas conditioning system.
Figure 5:
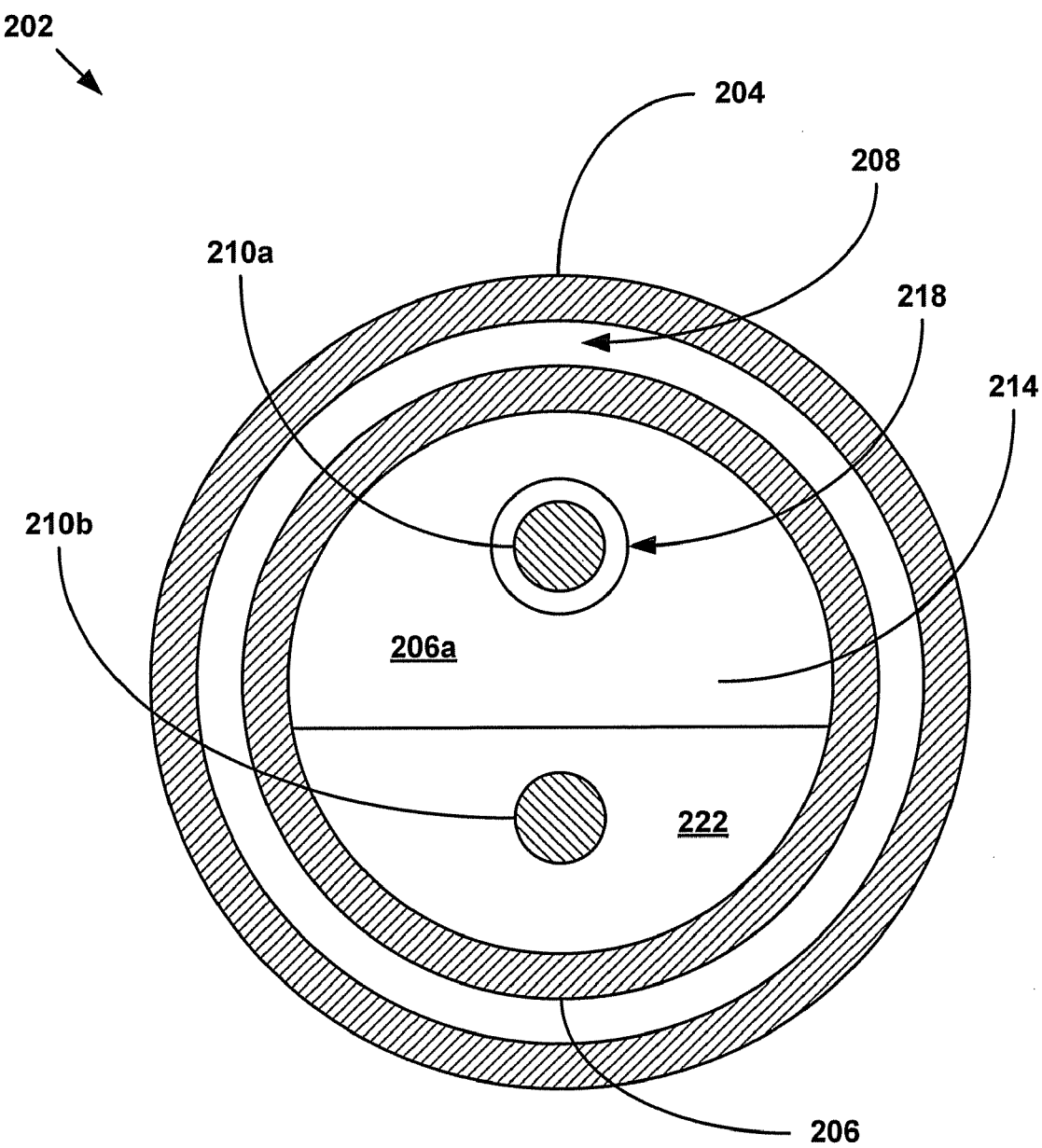
FIG. 5 is a fragmentary cross sectional illustration of the embodiment of FIG. 4.
Figure 6:
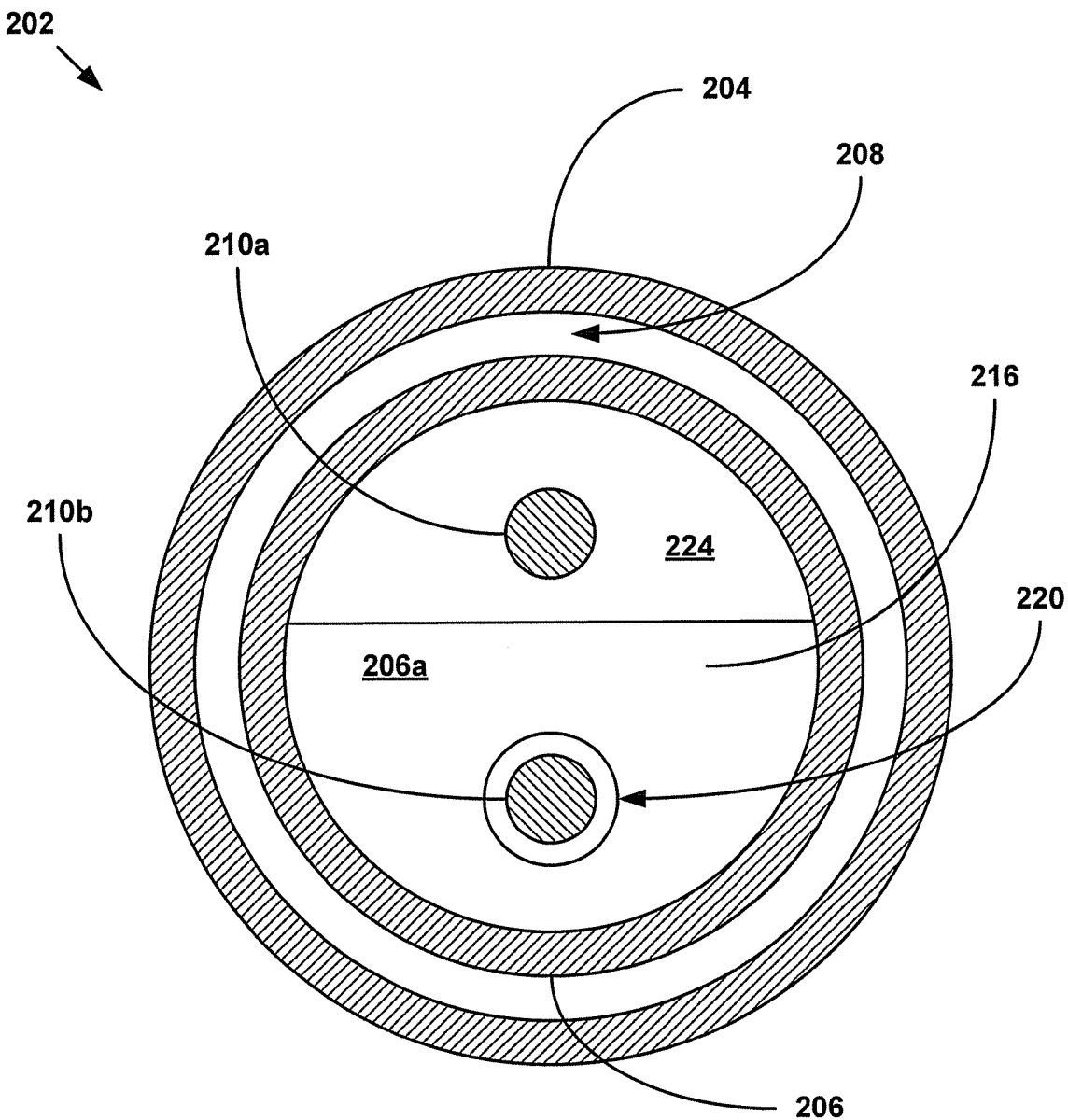
FIG. 6 is a fragmentary cross sectional illustration of the embodiment of FIG. 4.

Referring now to FIGS. 4, 5 and 6, an exemplary embodiment of a fuel gas conditioning system 200 includes a preheater assembly 202 that includes an outer tubular housing 204 and an inner tubular housing 206 that defines a longitudinal passage 206a that is positioned and supported within the outer tubular housing. An annulus 208 is thereby defined between the outer and inner tubular housings, 204 and 206. Heating tubes, 210a and 210b, are positioned and supported within the passage 206a of the inner tubular housing 206. In an exemplary embodiment, the heating tube 210a extends through and is positioned within an upper portion of the inner tubular housing 206 and the heating tube 210b extends through and is positioned within a lower portion of the inner tubular housing 206. In an exemplary embodiment longitudinally spaced apart baffles, 214 and 216, are received within and are coupled to the inner tubular housing 206.

The baffle 214 defines a longitudinal passage 214a for receiving a portion of the heating tube 210a and the baffle 216 defines a longitudinal passage 216a for receiving a portion of the heating tube 210b. In an exemplary embodiment, the baffle 214 includes a peripheral arcuate portion that engages and mates with an upper portion of the interior surface of the inner tubular housing 206 and the baffle 216 includes a peripheral arcuate portion that engages and mates with an lower portion of the interior surface of the inner tubular housing. In this manner, an annular axial flow passage 218 is defined between the heating tubes 210a and the baffle 214 and an annular axial flow passage 220 is defined between the heating tube 210 and the baffle 216. Furthermore, in this manner, a lower axial flow passage 222 is defined between the lower periphery of the baffle 214 and the interior surface of the lower portion of the inner tubular housing 206 and an upper axial flow passage 224 is defined between the lower periphery of the baffle 216 and the interior surface of the upper portion of the inner tubular housing 206. In this manner, the flow of fluidic materials in an axial direction through the inner tubular housing 206 may flow through the annular passages, 218 and 220, and in a serpentine path by virtue of the apart axial flow passages 222 and 224.

In an exemplary embodiment, the inside diameters of the longitudinal passages, 214a and 216a, of the spaced apart baffles, 214 and 216, are about $1/16^{th}$ to $1/8^{th}$ inch greater than the outside diameters of the heating tubes, 210a and 210b, that pass therethrough.

In an exemplary embodiment, the outer tubular housing 204 may be fabricated from, for example, a lower carbon steel tube having a wall thickness of about 0.280 inches and the inner tubular housing 206 may be fabricated from, for example, an H grade stainless steel having a wall thickness of about 0.134 inches. In an exemplary embodiment, the longitudinal spacing of the baffles, 214 and 216, may, for example, be about equal to the internal diameter of the inner tubular housing 206. In an exemplary embodiment, the heating tubes, 210a and 210b, may, for example, be conventional electrical operating heating tubes such as, for example, heating tubes commercially available from Gaumer Process in Houston, Tex.

A source 222 of an inlet stream of fluidic material is operably coupled to one end of the annulus 208 by a conduit 224 for conveying the inlet stream of fluidic materials into the annulus and a conduit 226 is operably coupled to another end of the annulus for conveying fluidic materials from the other end of the annulus into an end of the passage 206a. A conduit 228 is operably coupled to another end of the passage 206a for conveying fluidic materials from the other end of the passage into an outlet stream 230. In this manner, fluidic materials flow through the preheater assembly 202 by entering one end of the annulus 208, traveling through to the other end of the annulus, exiting the other end of the annulus through the conduit 226, entering one end of the passage 206a, passing through the passage, including passing through the annular axial passages, 218 and 220, and the axial passages, 222 and 224, and finally exiting the other end of the passage 206a into the passage 228 into an outlet stream 230. Thus, fluidic materials flow in one axial direction within the annulus 208 and in an opposite axial direction within the passage 206a.

In an exemplary embodiment, the source 222 of an inlet stream of fluidic material may, for example, include gaseous, liquid, ambient air, and/or natural gas materials and the outlet 230 may, for example, be used to provide a fuel source for a gas turbine.

In an exemplary embodiment, a controller 232 is operably coupled to the heating tubes, 210a and 210b, for controlling the operation of the heating tubes. In an exemplary embodiment, the controller 232 is further operably coupled to thermocouples, 234, 236 and 238, that in turn are operably coupled to the fluidic materials within the conduits, 224, 226 and 228. In this manner, the controller 232 may monitor the operating temperature of the fluidic materials within the conduits, 224, 226 and 228. In an exemplary embodiment, the controller 232 is also operably coupled to a flow control valve 238 for controlling the flow of fluidic materials through the conduit 226.

In an exemplary embodiment, during operation, fluidic materials from the source 222 are conveyed into one end of the annulus 208 by the conduit 224. Within the conduit 208, the fluidic materials are preheated by heat transmitted into the annulus through the walls of the inner tubular housing 206. Thus, in an exemplary embodiment, the operating temperature of the fluidic materials at the end of the annulus 208 are increased as they pass from the end of the annulus to the other end of the annulus. The fluidic materials then exit the other end of the annulus 208 and are conveyed to the end of the passage 206a by the conduit 226. Within the passage 206a, the fluidic materials are heated further by their interaction with the heating tubes, 210a and 210b. The heating of the fluidic materials within the passage 206a by the heating tubes, 210a and 210b, is significantly enhanced by forcing the fluidic materials to pass through the annular passages, 218 and 220, and the serpentine flow in the axial direction due to the baffles, 214 and 216. As a result, the operating temperature of the fluidic materials at the end of the passage 206a are significantly increased as they pass through the passage to the other end of the passage. The fluidic materials then exit the other end of the passage 206a and are conveyed to the outlet stream 230 by the conduit 228.

In an exemplary embodiment, the system 200 includes a plurality of baffles 214 which are interleaved with a plurality of baffles 216. In an exemplary embodiment, the system 200 includes a plurality of heating tubes, 210a and 210b.

In a first exemplary experimental embodiment, the system 200 of FIGS. 4, 5 and 6 was operated and yielded the following results:

| Elements of the system 200 | Parameter Value |
|---|---|
| The outer tubular housing 204 | 6 inch, schedule 40, carbon steel pipe |
| The inner tubular housing 206 | 5 inch, schedule 10, 304H stainless steel pipe |
| Number, spacing and outside diameter of heating tubes 210 | 9, 5 inches, and 0.475 inches |
| Number of baffles, 214 and 216 | 10 baffles 214 interleaved with 10 baffles 216 |
| Temperature and mass flow rate of inlet stream 218 | 70 degrees F. and 293 lbs/hour |
| Temperature of outlet stream 226 | 1200 degrees F. |
| Heat transfer coefficient of the system 200 | 25.31 btu/hr/ft$^2$/° F. |

In a second exemplary experimental embodiment, the system 200 of FIGS. 4, 5 and 6 was operated, without the baffles, 214 and 216, and yielded the following results:

| Elements of the system 200 | Parameter Value |
|---|---|
| The outer tubular housing 204 | 6 inch, schedule 40, carbon steel pipe |
| The inner tubular housing 206 | 5 inch, schedule 10, 304H stainless steel pipe |
| Number, spacing and outside diameter of heating tubes 210 | 9, 1.5 inches, and 0.475 inches |
| Number of baffles, 214 and 216 | N/A |
| Temperature and mass flow rate of inlet stream 218 | 70 degrees F. and 293 lbs/hour |
| Temperature of outlet stream 226 | 1200 degrees F. |
| Heat transfer coefficient of the system 200 | 4 btu/hr/ft$^2$/° F. |

In a third exemplary experimental embodiment, the system 200 of FIGS. 4, 5 and 6 was operated and yielded the following results:

| Elements of the system 200 | Parameter Value |
|---|---|
| The outer tubular housing 204 | 14 inch, standard carbon steel pipe |
| The inner tubular housing 206 | 12 inch, schedule 10, 304H stainless steel pipe |
| Number, spacing and outside diameter of heating tubes 210 | 48, 1.5 inches, and 0.475 inches |
| Number of baffles, 214 and 216 | 5 baffles 214 interleaved with 5 baffles 216 |
| Temperature and mass flow rate of inlet stream 218 | 80 degrees F. and 1880 lbs/hour |
| Temperature of outlet stream 226 | 1000 degrees F. |
| Heat transfer coefficient of the system 200 | 72.07 btu/hr/ft$^2$/° F. |

In a fourth exemplary experimental embodiment, the system 200 of FIGS. 4, 5 and 6 was operated, without the baffles, 214 and 216, and yielded the following results:

| Elements of the system 200 | Parameter Value |
|---|---|
| The outer tubular housing 204 | 14 inch, standard carbon steel pipe |
| The inner tubular housing 206 | 12 inch, schedule 10, 304H stainless steel pipe |
| Number, spacing and outside diameter of heating tubes 210 | 48, 1.5 inches, and 0.475 inches |
| Number of baffles, 214 and 216 | N/A |
| Temperature and mass flow rate of inlet stream 218 | 80 degrees F. and 1880 lbs/hour |
| Temperature of outlet stream 226 | 1000 degrees F. |
| Heat transfer coefficient of the system 200 | 12.2 btu/hr/ft$^2$/° F. |

In a fifth exemplary experimental embodiment, the system 200 of FIGS. 4, 5 and 6 was operated and yielded the following results:

| Elements of the system 200 | Parameter Value |
|---|---|
| The outer tubular housing 204 | 14 inch, standard carbon steel pipe |
| The inner tubular housing 206 | 12 inch, schedule 10, 304H stainless steel pipe |
| Number, spacing and outside diameter of heating tubes 210 | 36, 1.5 inches, and 0.475 inches |
| Number of baffles, 214 and 216 | 13 baffles 214 interleaved with 13 baffles 216 |
| Temperature and mass flow rate of inlet stream 218 | 80 degrees F. and 1135 lbs/hour |
| Temperature of outlet stream 226 | 800 degrees F. |
| Heat transfer coefficient of the system 200 | 57.8 btu/hr/ft$^2$/° F. |

In a sixth exemplary experimental embodiment, the system 200 of FIGS. 4, 5 and 6 was operated, without the baffles, 214 and 216, and yielded the following results:

| Elements of the system 200 | Parameter Value |
|---|---|
| The outer tubular housing 204 | 14 inch, standard carbon steel pipe |
| The inner tubular housing 206 | 10 inch, schedule 10, 304H stainless steel pipe |
| Number, spacing and outside diameter of heating tubes 210 | 36, 1.5 inches, and 0.475 inches |
| Number of baffles, 214 and 216 | N/A |
| Temperature and mass flow rate of inlet stream 218 | 80 degrees F. and 1135 lbs/hour |
| Temperature of outlet stream 226 | 800 degrees F. |
| Heat transfer coefficient of the system 200 | 9.8 btu/hr/ft$^2$/° F. |

In a seventh exemplary experimental embodiment, the system 200 of FIGS. 4, 5 and 6 was operated and yielded the following results:

| Elements of the system 200 | Parameter Value |
|---|---|
| The outer tubular housing 204 | 10 inch, schedule 40, carbon steel pipe |
| The inner tubular housing 206 | 8 inch, schedule 10, 304H stainless steel pipe |
| Number, spacing and outside diameter of heating tubes 210 | 24, 1.5 inches, and 0.475 inches |
| Number of baffles, 214 and 216 | 13 baffles 214 interleaved with 13 baffles 216 |
| Temperature and mass flow rate of inlet stream 218 | 348 degrees F./ and 1628 lbs/hour |
| Temperature of outlet stream 226 | 800 degrees F. |
| Heat transfer coefficient of the system 200 | 53.23 btu/hr/ft$^2$/° F. |

In a eighth exemplary experimental embodiment, the system 200 of FIGS. 4, 5 and 6 was operated, without the baffles, 214 and 216, and yielded the following results:

| Elements of the system 200 | Parameter Value |
|---|---|
| The outer tubular housing 204 | 10 inch, schedule 40, carbon steel pipe |
| The inner tubular housing 206 | 8 inch, schedule 10, 304H stainless steel pipe |
| Number, spacing and outside diameter of heating tubes 210 | 24, 1.5 inches, and 0.475 inches |
| Number of baffles, 214 and 216 | N/A |
| Temperature and mass flow rate of inlet stream 218 | 348 degrees F. and 1628 lbs/hour |
| Temperature of outlet stream 226 | 800 degrees F. |
| Heat transfer coefficient of the system 200 | 9.2 btu/hr/ft$^2$/° F. |

The exemplary test results of the system 200 that demonstrated an increased heat transfer for the system 200 with the baffles, 214 and 216, versus the system without the baffles were unexpected.

In an exemplary embodiment, one or more of the baffles, 216 and 218, within the system 200 may be omitted.

In an exemplary embodiment, during the operation of the system 200, the heat generated by the heating tubes 210 is transmitted by a combination of radiation, conduction and convection to the interior surface of the inner tubular housing 206. As a result, the operating temperature of the inner tubular housing 206 is increased and the fluidic material that flows within the annular passage 208 may be pre-heated by heat transmitted from the exterior surface of the inner tubular housing 206 to the annular passage by a combination of radiation, conduction and convection. Furthermore, as a result, the material composition of the outer tubular housing 204 that is required for typical operating conditions does not have to be as tolerant of heat and temperature as the inner tubular housing 206. For example, for typical operating conditions of the system 200, the outer tubular housing 204 may be fabricated from a carbon steel pipe while the inner tubular housing 206 may be fabricated from a high temperature stainless steel pipe.

In an exemplary embodiment, the counter flow of the fluidic materials within the system 200, through the inner passage 206a in a first axial direction, and the outer annular passage 208 in a second opposite axial direction, enhances heat transfer to the fluidic material that pass through the system and thereby decreases the response time within the system to changes in operating conditions such as, for example, step changes in one or more of the flow rate, the operating temperature(s), and the fluid composition.

In an exemplary embodiment, the use of outer and inner tubular housings, 204 and 206, in which the inner tubular housing houses the heating tubes 210 and contains the radiant energy generated by the heating tubes, permits the composition of the outer tubular housing to be less tolerant of high temperature operating conditions and thereby composed of a typically less expensive and lighter weight material.

In an exemplary embodiment, the use of outer and inner tubular housings, 204 and 206, in which the inner tubular housing houses the heating tubes 210 and contains the radiant energy generated by the heating tubes, and the counter flow and forced convection of the fluidic materials within the system 200, through the inner passage 206a in a first direction, and the outer annular passage 208 in a second opposite direction, enhances heat transfer.

In an exemplary embodiment, one or more aspects of the system of FIGS. 1, 2 and 3 may be combined in whole, or in part, with one or more aspects of the systems of FIGS. 4, 5 and 6.

Figure 7:
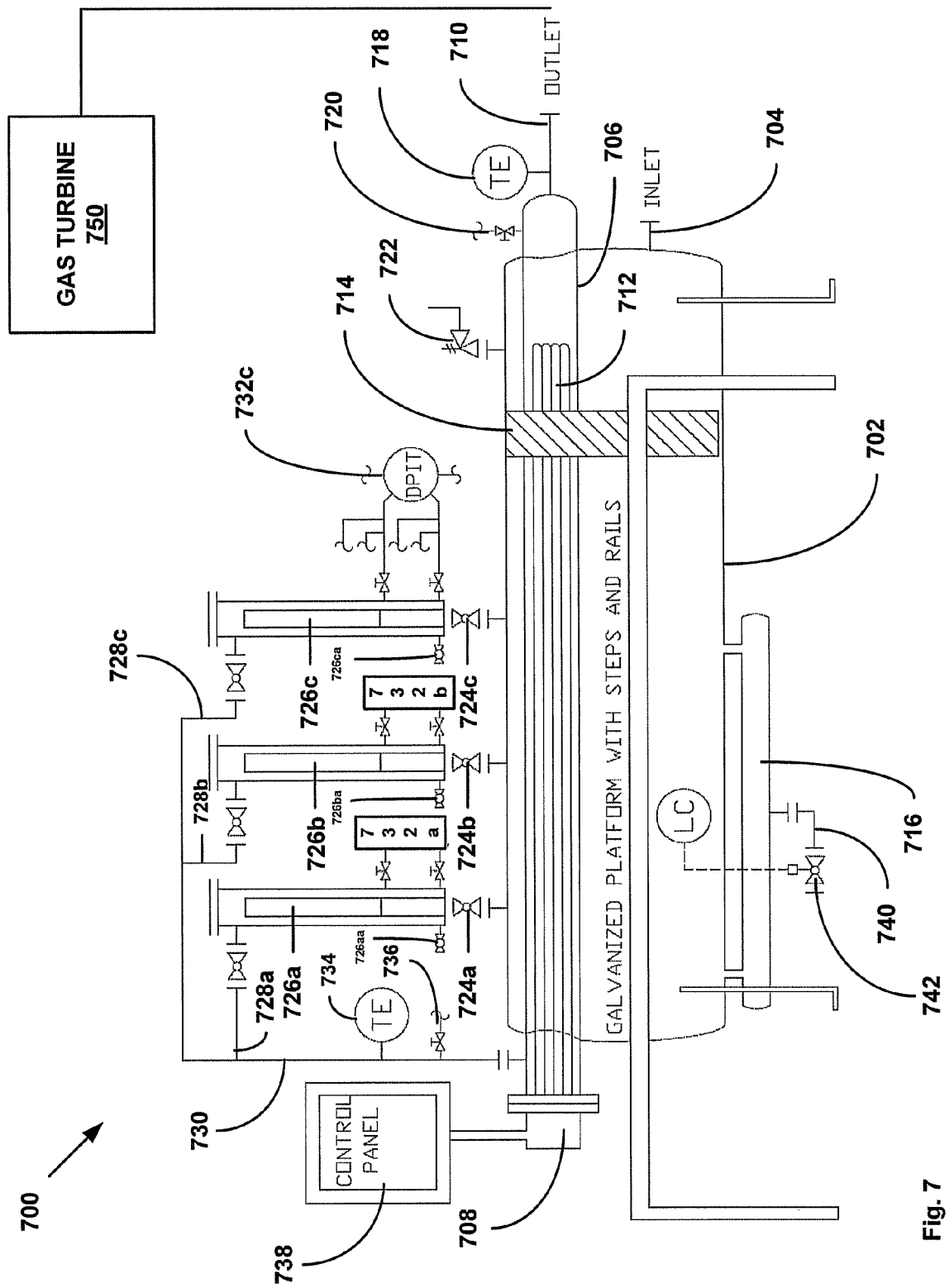
FIG. 7 is a schematic illustration of an alternate exemplary embodiment of a fuel gas conditioning system.
Figure 8:
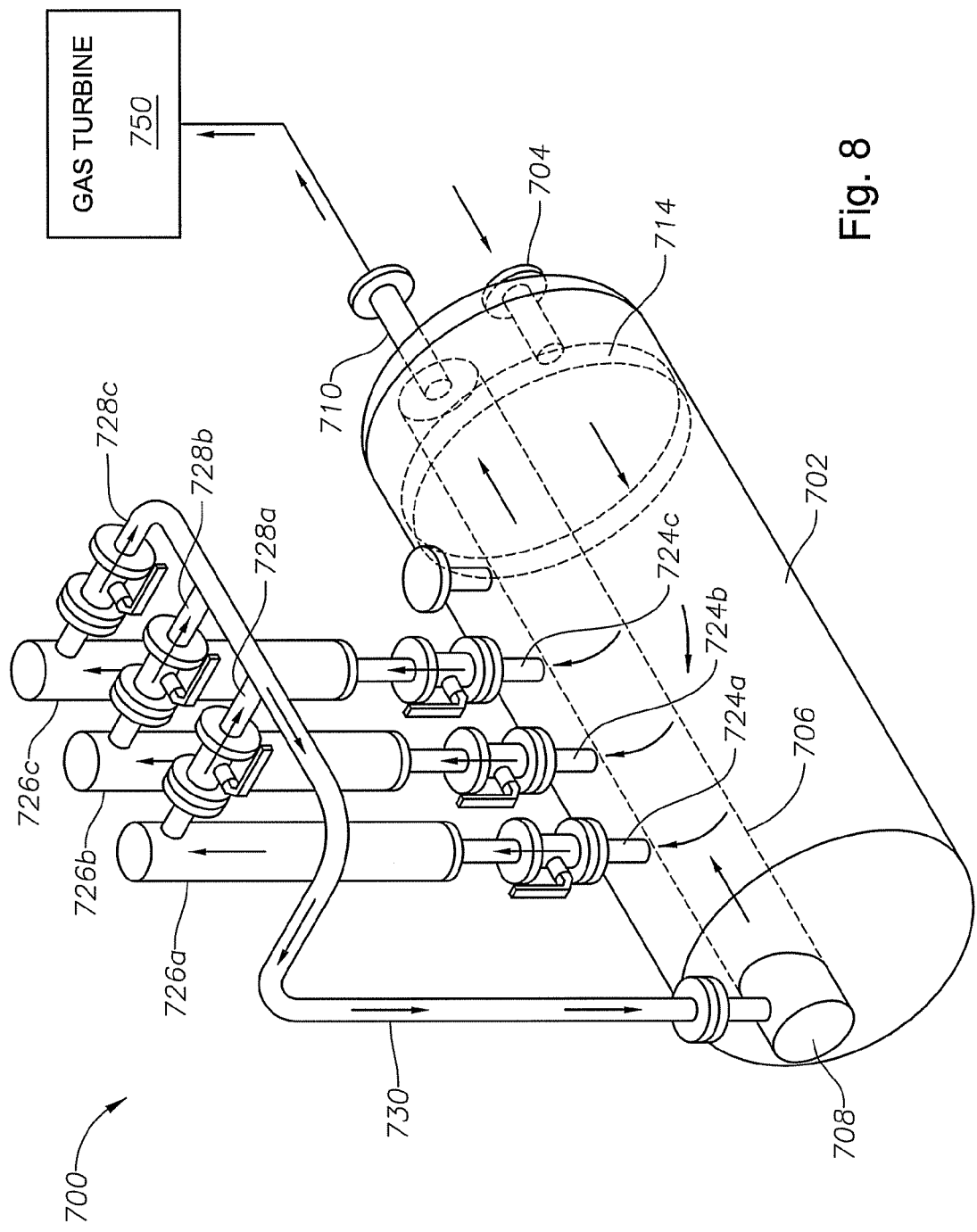
FIG. 8 is a perspective view of the fuel gas conditioning system of FIG. 7.
Figure 9:
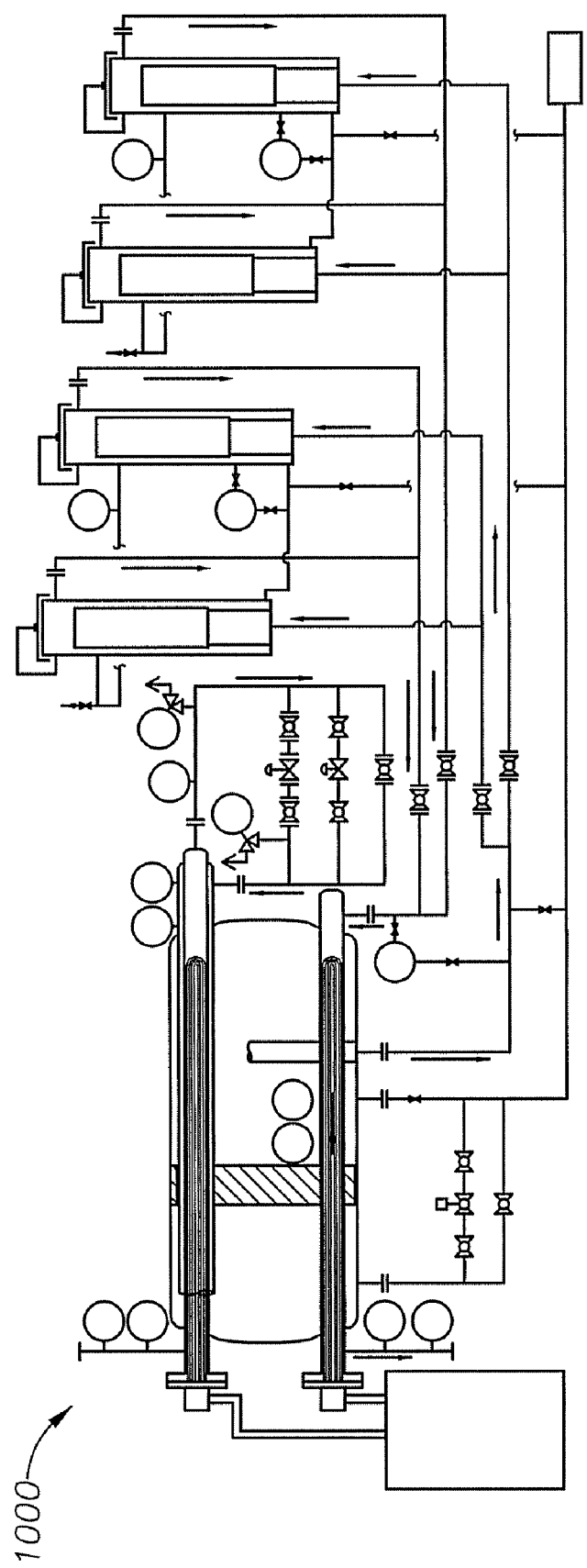
FIG. 9 is a schematic illustration of an alternate exemplary embodiment of a fuel gas conditioning system.
Figure 9A:
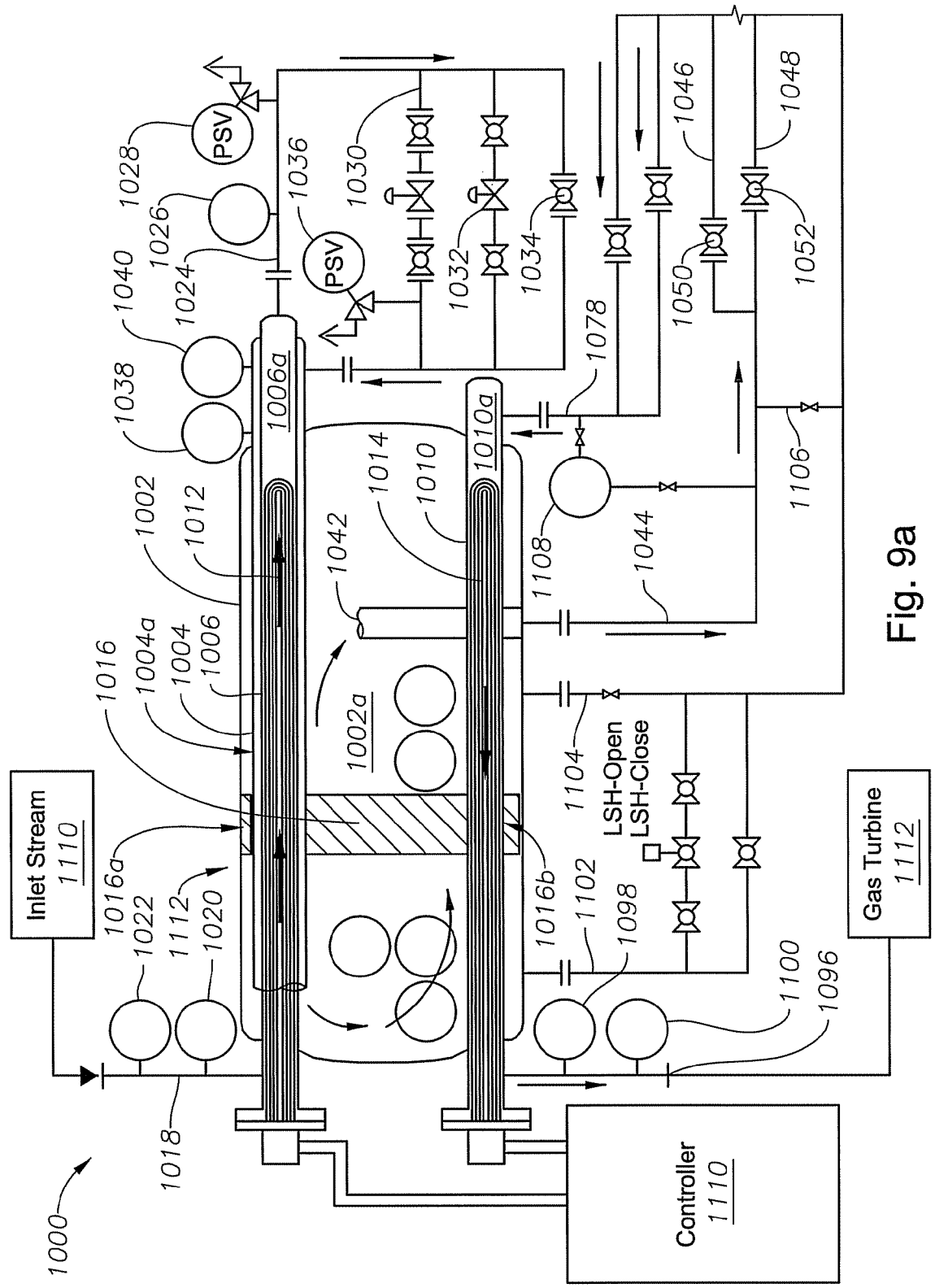
FIG. 9a is a partial schematic illustration of the fuel gas conditioning system of FIG. 9.
Figure 9B:
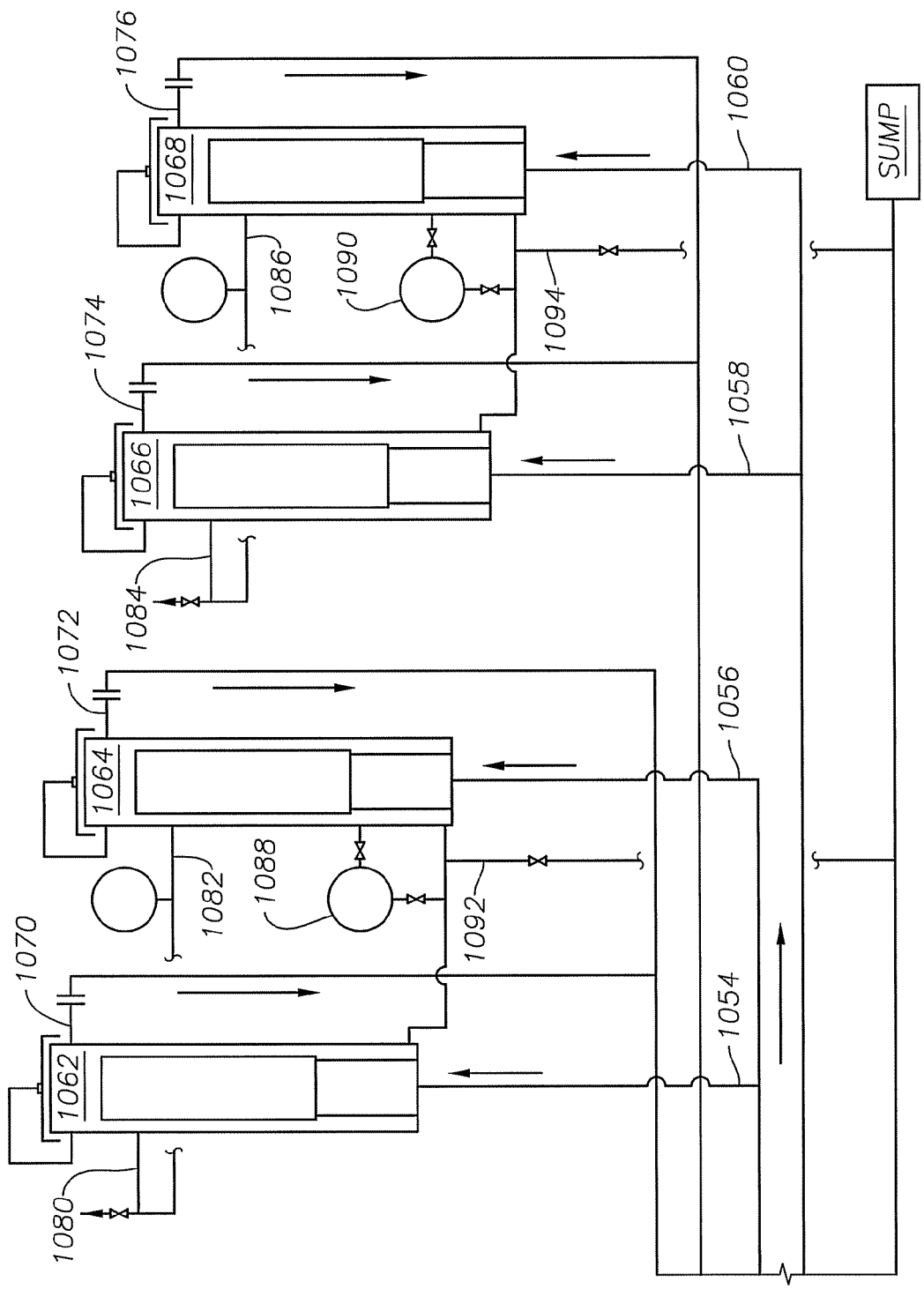
FIG. 9b is a partial schematic illustration of the fuel gas conditioning system of FIG. 9.
Figure 9C:
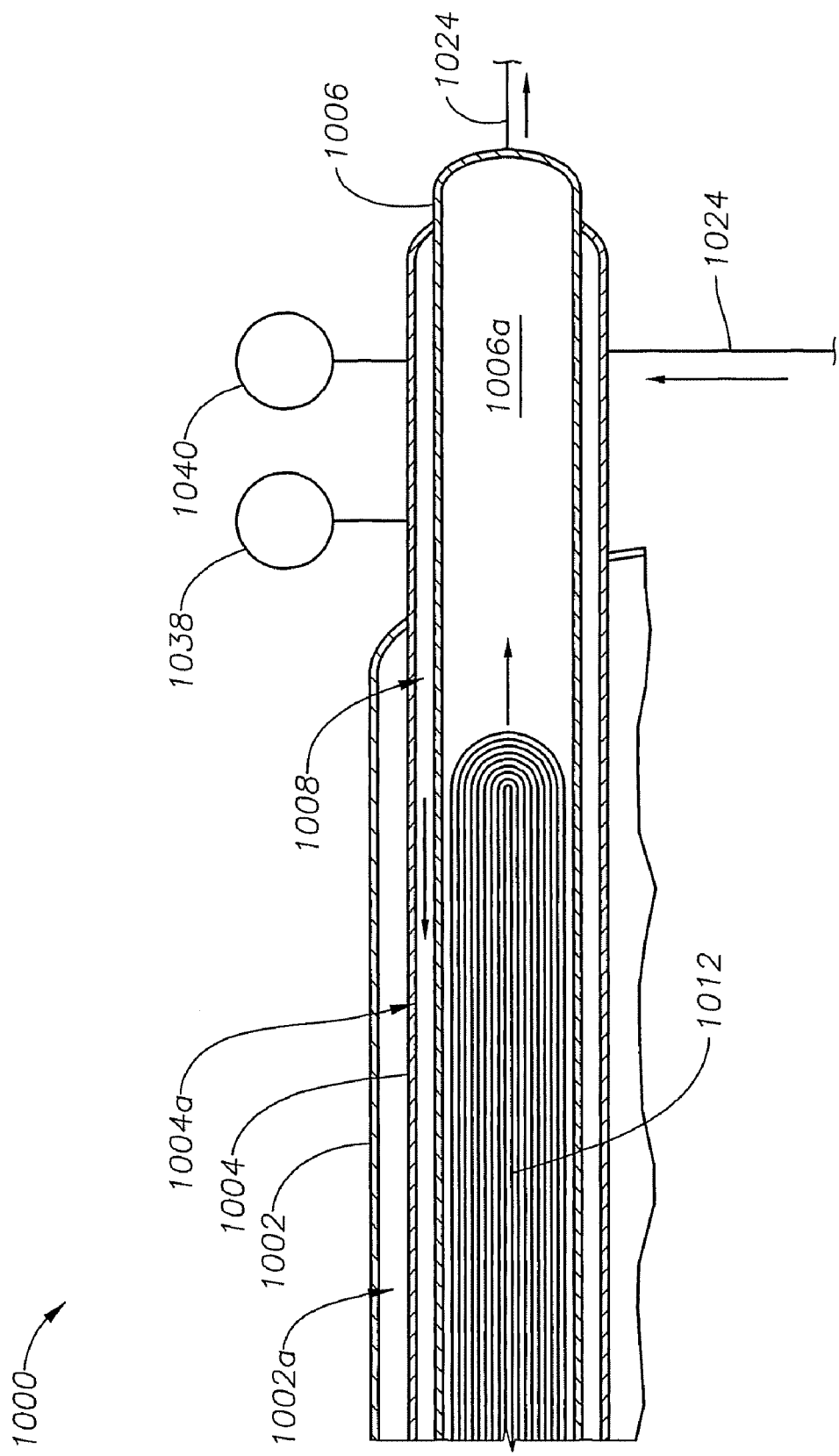
FIG. 9c is a partial schematic illustration of the fuel gas conditioning system of FIG. 9.

Referring now to FIGS. 7 and 8, an exemplary embodiment of a system 700 for conditioning fuel gas includes an outer housing 702 having an inlet 704 at one end for admitting fluidic materials into the outer housing. An inner housing 706 extends into and through the interior of the outer housing 702 that includes an end cap 708 at one end and an outlet 710 at the other end. One or more heating elements 712 are positioned and supported within the interior of the inner housing 706 for heating fluidic materials within the inner housing. A mesh or vane pack element 714 mates with and is received within the interior of the outer housing 702 for physically intercepting aerosol particles within the outer housing. The element 714 further defines a passage that receives and mates with the exterior of the inner housing 706. A sump housing 716 is fluidicly coupled to the lower portion of the outer housing 702 for collecting and removing fluidic materials therefrom.

A temperature sensor 718 is operably coupled to the outlet 710 of the outer housing 702 and a pressure sensor 720 is operably coupled to the outer housing proximate the outlet for monitoring the operating temperature of the fluidic materials within the outlet and the operating pressure of the fluidic materials within the outer housing proximate the outlet, respectively. A thermal pressure relief valve 722 is also operably coupled to the outer housing 702 for providing a pressure relief.

Flow passages, 724a, 724b and 724c, are fluidically coupled to the upper portion of the outer housing 702 for conveying fluidic materials out of the outer housing and into and through lower ends of filter and coalescer elements, 726a, 726b and 726c, respectively, for intercepting aerosol particles, via inertial impaction, and Brownian motion. In an exemplary embodiment, the filter and coalescer elements, 726a, 726b and 726c, each include drainage lines 726aa, 726ba and 726ac, respectively, for draining accumulated fluids therein.

Ends of flow passages, 728a, 728b and 728c, are fluidic coupled to the upper end of the filter and coalescer elements, 726a, 726b and 726c, respectively, for conveying fluidic materials out of the upper ends of the filter and coalescer elements. A flow passage 730 is fluidically coupled to the other ends of the flow passages, 728a, 728b and 728c, for conveying fluidic materials therefrom into the interior of the inner housing 706.

Differential pressure indicating transmitters, 732a, 732b and 732c, are operably coupled to the filter and coalescer elements, 726a, 726b and 726c, respectively, for monitoring the liquid level within the elements. A temperature sensor 734 and a pressure sensor 736 are operably coupled to the flow passage 730 for monitoring the operating temperature and pressure, respectively, of the fluidic materials therein.

A controller 738 is operably coupled to the heating elements 712, the temperature sensor 718, the pressure sensor 720, the thermal pressure relief valve 722, the differential pressure indicating transmitters, 732a, 732b and 732c, the temperature sensor 734, and the pressure sensor 736 for monitoring and controlling the operation of each.

A drain line 740 and valve 742 are operably coupled to the sump housing 716 for Permitting fluidic materials collected therein to be exhausted from the sump housing. In an exemplary embodiment, the operation of the valve 742 is monitored and controlled by the controller 738.

In an exemplary embodiment, the heating elements 712, may, for example, be conventional electrical operating heating tubes such as, for example, heating tubes commercially available from Gaumer Process of Houston, Tex.

In an exemplary embodiment, the mesh or vane pack element 714 are conventional commercially available mesh or vane pack elements that are commercially available from the Gaumer Process of Houston, Tex. In an exemplary embodiment, the mesh or vane pack element 714 intercepts aerosol particles. In an exemplary embodiment, the mesh or vane pack element 714 defines a tortuous flow path therethrough that allows gases to pass but prevents the passages of liquid droplets. In an exemplary embodiment, the mesh or vane pack element 714 defines a tortuous flow path therethrough that allows gases to pass but prevents the passages of liquid droplets having an average mean diameter of at least about 3 to 8 microns and larger. As a result, in an exemplary embodiment, the liquid droplets blocked by the mesh or vane pack element 714 stick to the surfaces of the tortuous path defined by the element and multiple liquid droplets then coalesce and then drop down within the outer housing 702 and into the drain sump 716.

In an exemplary embodiment, the temperature sensors 718 and 734 are conventional commercially available temperature sensors for monitoring the amount of thermal energy added to the fluidic materials within the system 700 during operation. In an exemplary embodiment, the operating temperatures sensed by the temperature sensors 718 and 734 are provided to the controller 738 to provide a closed loop feedback control system for controlling the heating elements 712 to thereby deliver the predetermined amount of thermal energy into the fluidic materials within the system 700 during operation In an exemplary embodiment, the pressure sensors 720 and 736 are conventional commercially available pressure sensor for monitoring the differential operating pressure of the fluidic materials within the system 700 during operation.

In an exemplary embodiment, the thermal pressure relief valve 722 is a conventional commercially available thermal pressure relief valve that is adapted to provide a pressure release in the event that the operating pressure within the outer housing 702 is excessive.

In an exemplary embodiment, the filter and coalescer elements, 726a, 726b and 726c, are conventional commercially available filter and coalescer elements that intercept aerosol particles, via inertial impaction, and Brownian motion. In an exemplary embodiment, as a result, for example, liquid droplets that pass into the filter and coalescer elements, 726a, 726b and 726c, coalesce and are thereby removed from the fluidic materials.

In an exemplary embodiment, the differential pressure indicating transmitters, 732a, 732b and 732c, are conventional commercially available differential pressure indicating transmitters that monitor the liquid level within the corresponding filter and coalescer elements, 726a, 726b and 726c. In an exemplary embodiment, if the liquid level within the filter and coalescer elements, 726a, 726b and 726c, exceeds a predetermined limit, the corresponding differential pressure indicating transmitters, 732a, 732b and 732c, generate and transmit an alarm signal to the controller 738.

In an exemplary embodiment, the controller 738 is a conventional commercially available programmable controller that may, for example, include a digital and/or an analog controller. In an exemplary embodiment, the controller 738 is operably coupled to the heating elements 712, the temperature sensor 718, the pressure sensor 720, the thermal pressure relief valve 722, the differential pressure indicating transmitters, 732a, 732b and 732c, the temperature sensor 734 and the pressure sensor 736 for monitoring and controlling the operation of each.

In an exemplary embodiment, during the operation of the system 700, the system operates the heating elements 712 to add heat to the fluidic materials within the system after aerosol liquid particles are removed from the fluidic materials by the mesh or vane pack element 714 and the filter and coalescer elements, 726a, 726b and 726c. In an exemplary embodiment, the fluidic materials within the system 700 include a fuel gas. As a result, in an exemplary embodiment, the system 700 heats the fuel gas to an operating temperature above the dew point of the fuel gas and also prevents condensation of the fuel gas in downstream processes, such as combustion processes using the fuel gas.

In an exemplary embodiment, the system 700 is operated to provide a fuel gas for combustion in a gas turbine 750. Thus, in an exemplary embodiment, the outlet 710 of the system 700 at least partially provides a fuel gas for subsequent combustion in a gas turbine 750.

In an exemplary embodiment, as illustrated in FIG. 8, during operation of the system 700, fluidic materials enter the inlet 704, enter the outer housing 702, pass through the mesh or vane pack element 714, enter the passages, 724a, 724b, and 724c, pass through the filter and coalescer elements, 726a, 726b and 726c, enter the passages, 728a, 728b and 728c, enter the passage 730, enter the inner housing 706, and then exit the inner housing through the outlet 710. Within the inner housing 706, the fluidic materials are heated by operation of the heating elements 712. The fluidic materials that exit the inner housing 706 through the outlet 710 are then consumed by operation of the gas turbine 750.

Referring now to FIGS. 9, 9a, 9b, and 9c, an exemplary embodiment of a system 1000 for conditioning fuel gas includes an outer housing 1002 that defines a chamber 1002a therein. An inner tubular housing 1004 that defines a chamber 1004a extends into and through the chamber 1002a of the outer housing 1002. An inner tubular housing 1006 that defines a chamber 1006a extends into and through the chamber 1002a of the outer housing 1002 and at least partially into and through the chamber 1004a of the inner tubular housing 1004. As a result, the inner tubular housing 1006 is positioned at least partially within the inner tubular housing 1004 and an annular passage 1008 is defined between the interior surface of the inner tubular housing 1004 and the exterior surface of the inner tubular housing 1006. An inner tubular housing 1010 that defines a chamber 1010a extends into and through the chamber 1002a of the outer housing 1002.

One or more heating elements 1012 are positioned and supported within the interior chamber 1006a of the inner tubular housing 1006 for heating fluidic materials therein and one or more heating elements 1014 are positioned and supported within the interior chamber 1010a of the inner tubular housing 1010 for heating fluidic materials therein.

A mesh or vane pack element 1016 mates with and is received within the interior chamber 1002a of the outer housing 1002 for physically intercepting aerosol particles within the outer housing. The element 1016 further defines passages, 1016a and 1016b, that receive and mate with the exterior of the inner tubular housings, 1004 and 1010, respectively.

An inlet passage 1018 is fluidicly coupled to the interior chamber 1006a of the inner tubular housing 1006 for conveying fluidic materials therein. In an exemplary embodiment, a temperature sensor 1020 and a pressure sensor 1022 are operably coupled to the passage 1018 for monitoring the operating temperature and pressure, respectively, within the passage.

A passage 1024 is fluidicly coupled to the interior chamber 1006a of the inner tubular housing 1006 and the interior chamber 1004a of the inner tubular housing 1004 for conveying fluidic materials from the interior chamber 1006a of the inner tubular housing 1006 and into the annular passage 1008. In an exemplary embodiment, a temperature sensor 1026 and a thermal pressure release valve 1028 are operably coupled to the passage 1024 for monitoring the operating temperature of fluidic materials within the passage and for monitoring the operating pressure of the fluidic materials within the passage. In an exemplary embodiment, the thermal pressure release valve 1028 is further adapted to relieve operating pressure within the passage 1024 if the operating pressure exceeds a predetermined value.

In an exemplary embodiment, the passage 1024 further includes pressure control passages with corresponding operating valves, 1030, 1032 and 1034, that permit the pressure drop across the passage 1024 to be controlled. In an exemplary embodiment, at least one of the pressure control passages, 1030, 1032 and 1034, are also operably coupled to a corresponding full flow relief valve 1036 for relieving operating pressure within the passages if the operating pressure exceeds a predetermined value. In an exemplary embodiment, the flow control valves provided in the passages, 1030 and 1032, may be automatically controlled while the flow control valve provided in the passage 1034 may be manually operated.

In an exemplary embodiment, a temperature sensor 1038 and a pressure sensor 1040 are operably coupled to the annular passage 1008 for monitoring the operating temperature and pressure within the passage. In an exemplary embodiment, the operating temperature and pressure values obtained by the temperature sensor 1038 and the pressure sensor 1040 may be used to control the volumetric flow of fluidic materials through the passages, 1030 and 1032, by controlling the operation of the corresponding flow control valves therein. In an exemplary embodiment, the operating temperature and pressure values obtained by the temperature sensor 1038 and the pressure sensor 1040 may be used to control the percent degree to which the flow control valves provided in the passages, 1030 and 1032, are opened.

A conduit 1042 for conveying fluidic materials extends into the chamber 1002a of the housing 1002 for conveying fluidic materials out of the housing. An end of a passage 1044 is operably coupled to the conduit 1042 for conveying fluidic materials therefrom and ends of passages, 1046 and 1048, are operably coupled to another end of the passage 1044 for conveying fluidic materials therefrom. Flow control valves, 1050 and 1052, are operably coupled to the passages, 1046 and 1048, respectively, for controlling the flow of fluidic materials therein.

Ends of passages, 1054 and 1056 and 1058 and 1060, are operably coupled to other ends of the passages, 1046 and 1048, respectively, for conveying fluidic materials therefrom. The other ends of the passages, 1054 and 1056 and 1058 and 1060, are operably coupled to the inlets of filter and coalescer elements, 1062 and 1064 and 1066 and 1068, respectively, for intercepting aerosol particles, via inertial impaction, and Brownian motion within the fluidic materials therein. Ends of passages, 1070, 1072, 1074 and 1076, are operably coupled to outlets of the filter and coalescer elements, 1062 and 1064 and 1066 and 1068, respectively, for conveying fluidic materials therefrom to an inlet passage 1078 that is operably coupled to an end of the housing 1010.

Venting passages, 1080, 1082, 1084 and 1086, are operably coupled to the filter and coalescer elements, 1062 and 1064 and 1066 and 1068, respectively, for venting fluidic materials therefrom during, for example, maintenance of the filter and coalescer elements. Differential pressure indicating transmitters, 1088 and 1090, are operably coupled to the filter and coalescer elements, 1062 and 1064 and 1066 and 1068, respectively, for monitoring the liquid level within the elements. The filter and coalescer elements, 1062 and 1064 and 1066 and 1068, are also operably coupled to a sump by drain passages, 1092 and 1094, respectively.

An outlet passage 1096 is operably coupled to another end of the housing 1010 for conveying fluidic materials therefrom. A temperature sensor 1098 and a pressure sensor 1100 are operably coupled to the outlet passage 1096 for monitoring the operating temperature and pressure of the fluidic materials therein.

The chamber 1002a of the housing 1002 is operably coupled to the sump by a number of drain passages, 1102 and 1104, and associated flow control valves, for permitting liquids that may accumulate within the bottom of the chamber of the housing to be drained to the sump. The passage 1044 is also operably coupled to the sump by a drain passage 1106 and associated flow control valves to permit liquids that may accumulate within the passage 1044 to be drained to the sump.

A differential pressure indicating transmitter 1108 is operably coupled to the passage 1078 for monitoring the liquid level therein. In an exemplary embodiment, as a result, the differential pressure indicating transmitter 1108 may provide an indication of the degree to which the filter elements within the filter and coalescer elements, 1062 and 1064 and 1066 and 1068, may be dirty and therefore may require replacement.

A controller 1110 is operably coupled to the heating elements, 1012 and 1014, the temperature sensors, 1020, 1026, 1038, and 1098, the pressure sensors, 1022, 1040, and 1100, the thermal pressure relief valves, 1028 and 1036, and the differential pressure indicating transmitters, 1088, 1090, and 1108, for monitoring and controlling the operation of each.

In an exemplary embodiment, the heating elements, 1012 and 1014, may, for example, be conventional electrical operating heating tubes such as, for example, heating tubes commercially available from Gaumer Process of Houston, Tex.

In an exemplary embodiment, the mesh or vane pack element 1016 are conventional commercially available mesh or vane pack elements that are commercially available from Gaumer Process of Houston, Tex. In an exemplary embodiment, the mesh or vane pack element 1016 intercepts aerosol particles. In an exemplary embodiment, the mesh or vane pack element 1016 defines a tortuous flow path therethrough that allows gases to pass but prevents the passages of liquid droplets. As a result, in an exemplary embodiment, the liquid droplets blocked by the mesh or vane pack element 1016 stick to the surfaces of the tortuous path defined by the element and multiple liquid droplets then coalesce and then drop down within the outer housing 1002 and into the drain sump.

In an exemplary embodiment, the temperature sensors, 1020, 1026, 1038, and 1098, are conventional commercially available temperature sensors for monitoring the amount of thermal energy added to the fluidic materials within the system 1000 during operation. In an exemplary embodiment, the operating temperatures sensed by the temperature sensors, 718 1020, 1026, 1038, and 1098, are provided to the controller 1110 to provide a closed loop feedback control system for controlling the heating elements, 1012 and 1014, to thereby deliver the predetermined amount of thermal energy into the fluidic materials within the system 1000 during operation In an exemplary embodiment, the pressure sensors, 1022, 1040, and 1100, are conventional commercially available pressure sensors for monitoring the operating pressure of the fluidic materials within the system 1000 during operation.

In an exemplary embodiment, the thermal pressure relief valves, 1028 and 1036, are conventional commercially available thermal pressure relief valves that are adapted to provide a pressure release in the event that the operating pressure within the system 1000 is excessive.

In an exemplary embodiment, the filter and coalescer elements, 1062 and 1064 and 1066 and 1068, are conventional commercially available filter and coalescer elements that intercept aerosol particles, via inertial interception, and Brownian motion. In an exemplary embodiment, as a result, for example, liquid droplets that pass into the filter and coalescer elements, 1062 and 1064 and 1066 and 1068, coalesce and are thereby removed from the fluidic materials.

In an exemplary embodiment, the controller 1110 is a conventional commercially available programmable controller that may, for example, include a digital and/or an analog controller. In an exemplary embodiment, the controller 1110 is operably coupled to the heating elements, 1012 and 1014, the temperature sensors, 1020, 1026, 1038, and 1098, the pressure sensors, 1022, 1040, and 1100, the thermal pressure relief valves, 1028 and 1036, and the differential pressure indicating transmitters, 1088, 1090, and 1108, for monitoring and controlling the operation the operation of each.

In an exemplary embodiment, during the operation of the system 1000, an inlet stream 1110 of fluidic materials is operably coupled to the inlet passage 1018. In an exemplary embodiment, the inlet stream 1110 of fluidic materials have an operating temperature of about 60 degree F. and an operating pressure of about 1350 psig.

The fluidic materials then pass into the chamber 1006a of the housing 1006 and thereby pass through and are heated by the heating elements 1012 therein. In an exemplary embodiment, the fluidic materials are heated within the chamber 1006a of the housing 1006 to an operating temperature of about 100 F. The fluidic materials then are conveyed out of the chamber 1006a of the housing by the passage 1024 and the fluidic materials are then conveyed into and through the annular passage 1008. In an exemplary embodiment, the operating pressure of the fluidic materials drops within the passage 1024 to about 900 psig and the operating temperature drops to about 60 F.

The fluidic materials within the chamber 1006a of the housing 1006 flow in the opposite direction of the fluidic materials within the annular passage 1008 and are heated. In an exemplary embodiment, the operating pressure of the fluidic materials that exit the annular passage 1008 is about 900 psig and the operating temperature of the fluidic materials that exit the annular passage is about 70 F.

In an exemplary embodiment, the flow of the fluidic materials: a) into and through the chamber 1006a of the housing 1006 where they are heated by the heating elements 1012; and then b) into and through the annular passage 1008 where they are heated by the walls of the housing 1006 provides a cross heat exchanger 1112.

The fluidic materials then exit the annular passage 1008 and are conveyed into the other end of the chamber 1002a of the housing 1002. The fluidic materials are then conveyed through the element 1016 and then into and through the conduit 1042. In an exemplary embodiment, the element 1016 removes about 99.99% of all particles having an average diameter of at least about 3-8 microns from the fluidic materials that pass therethrough.

The fluidic materials then enter and are conveyed through the passages, 1044, 1046, 1048, 1054, 1056, 1058 and 1060, and then into and through filter and coalescer elements, 1062 and 1064 and 1066 and 1068. In an exemplary embodiment, the operating pressure and temperature of the fluidic materials that enter the filter and coalescer elements, 1062 and 1064 and 1066 and 1068, are about 900 psig and 70 F, respectively.

The fluidic materials exit the filter and coalescer elements, 1062 and 1064 and 1066 and 1068, and enter and pass through the passages, 1070, 1072, 1074 and 1076, and enter the end of the chamber 1010a of the housing 1010 through the inlet passage 1078. In an exemplary embodiment, the filter and coalescer elements, 1062 and 1064 and 1066 and 1068, remove about 99.99% of all colaesced droplets and particles having an average diameter of at least about 0.3 microns from the fluidic materials that pass therethrough.

The fluidic materials then pass through and are heated by the heating elements 1014 within the chamber 1010a of the housing 1010 and then exit the housing through the outlet passage 1096. In an exemplary embodiment, the operating pressure and temperature of the fluidic materials that exit the system 1000 through the outlet passage 1096 are 900 psig and 100 F, respectively. In an exemplary embodiment, the fluidic materials that exit the system 1000 through the outlet passage 1096 are then used as a feed gas for a gas turbine. In an exemplary embodiment, the fluidic materials that pass through the chamber 1010a of the housing 1010 are heated by the heating tubes 1014 to an operating temperature above the dew point of the feed gas.

In an exemplary embodiment, during the operation of the system 1000, the combination of the operation of the filter and coalescer elements, 1062 and 1064 and 1066 and 1068, and the cross heat exchanger 1112 provides a stage of separation of aerosols from the feed gas of greater than one. In particular, in an exemplary embodiment, liquid droplets within the fluidic materials are heated sufficiently within the cross heat exchanger 1112 such that lighter hydrocarbon droplets are vaporized. As a result, the system 1000 may provide a stage of separation of aerosols from the feed gas of greater than one.

In several exemplary experimental embodiments of the system 700, the operation of the system provided the following experimental results:

| Operating Parameter | Experimental Embodiment of the System 700 | | | | | | |
|---|---|---|---|---|---|---|---|
| | Frame 7FA | LM6000 | Mars 100 | 5 ST 30's | Seal Gas | GE 7EA | LM2500 |
| Flow Rate Through System 700 million | 52.5 | 12.5 | 3.6 | 5.8 | 0.72 | 29 | 6.9 |

-continued

| | Experimental Embodiment of the System 700 | | | | | | |
|---|---|---|---|---|---|---|---|
| Operating Parameter | Frame 7FA | LM6000 | Mars 100 | 5 ST 30's | Seal Gas | GE 7EA | LM2500 |
| standard cubic feet per day (MMSCFD) | | | | | | | |
| Flow Rate Through System 700 (Lb/Hr) | 10700 | 25423 | 7321 | 11850 | 1500 | 58800 | 14000 |
| Temperature at Inlet 704 (Deg ° F.) | 80 | 80 | 80 | 80 | 80 | 80 | 80 |
| Pressure at Inlet 704 (Psig) | 475 | 550 | 450 | 450 | 400 | 375 | 450 |
| Input Power to Heating Elements 712 (KW) | 941 | 224 | 64 | 104 | 13 | 517 | 123 |
| Cross Sectional Area of Tubular Housing 706 That Contains The Heating Elements 712 (ft²) | 2.3 | 1.1 | 0.3 | 0.3 | 0.1 | 2.3 | 0.3 |
| Temperature at Outlet 710 (Deg ° F.) | 130 | 130 | 130 | 130 | 130 | 130 | 130 |
| Inside Diameter of Outer Tubular Housing 702 (Inches) | 54 | 30 | 18 | 24 | 12 | 48 | 24 |
| Flow Rate Through The System 700 actual cubic feet per minute (ACFM) | 1175 | 240 | 85 | 140 | 20 | 825 | 165 |
| Outside Diameter of Element 714 (Pipe Size) | 54 | 30 | 18 | 24 | 12 | 48 | 24 |

| | Experimental Embodiment of the System 700 | | | | | | |
|---|---|---|---|---|---|---|---|
| Operating Parameter | Centaur 40 | Alloy PG | Alloy SK | SGT-700 | RB-211 | Aera | Shell |
| Flow Rate Through System 700 million standard cubic feet per day (MMSCFD) | 1.4 | 3.5 | 12.5 | 10 | 6 | 10 | 6 |
| Flow Rate Through | 2841 | 7200 | 25500 | 21108 | 12665 | 20339 | 12685 |

-continued

Experimental Embodiment of the System 700

| Operating Parameter | Centaur 40 | Alloy PG | Alloy SK | SGT-700 | RB-211 | Aera | Shell |
|---|---|---|---|---|---|---|---|
| System 700 (Lb/Hr) | | | | | | | |
| Temperature at Inlet 704 (Deg °F.) | 80 | 110 | 103 | 70 | 60 | 50 | 108 |
| Pressure at Inlet 704 (Psig) | 450 | 115 | 230 | 400 | 819 | 100 | 203 |
| Input Power to Heating Elements 712 (KW) | 25 | 63 | 224 | 186 | 111 | 107 | 112 |
| Cross Sectional Area of Tubular Housing 706 That Contains The Heating Elements 712 (ft$^2$) | 0.2 | | | | | | |
| Temperature at Outlet 710 (Deg °F.) | 130 | 160 | 153 | 120 | 110 | 80 | 110 |
| Inside Diameter of Outer Tubular Housing 702 (Inches) | 12 | 24 | 42 | 36 | 30 | 24 | 24 |
| Flow Rate Through The System 700 actual cubic feet per minute (ACFM) | 35 | 315 | 600 | 275 | 80 | 930 | 325 |
| Outside Diameter of Element 714 (Pipe Size) | 6 | 10 | 24 | 16 | 8 | 24 | 18 |

| Operating Parameter | Experimental Embodiment of the System 700 | |
|---|---|---|
| | 3-7FA | LMS 100 |
| Flow Rate Through System 700 million standard cubic feet per day (MMSCFD) | 64.3 | 64.3 |
| Flow Rate Through System 700 (Lb/Hr) | 131000 | 48000 |
| Temperature at Inlet 704 (Deg °F.) | 50 | 75 |
| Pressure at Inlet 704 (Psig) | 435 | 960 |
| Input Power to Heating Elements 712 (KW) | 1152 | 422 |
| Temperature at Outlet 710 (Deg °F.) | 100 | 125 |
| Inside Diameter of Outer Tubular | 54 | 36 |

| Operating Parameter | Experimental Embodiment of the System 700 | |
|---|---|---|
| | 3-7FA | LMS 100 |
| Housing 702 (Inches) | | |
| Flow Rate Through The System 700 actual cubic feet per minute (ACFM) | 315 | 315 |
| Outside Diameter of Element 714 (Pipe Size) | 10 | 10 |

The exemplary tabular experimental results for the system 700 were unexpected results.

An apparatus for conditioning feed gas has been described that includes an outer tubular housing; an inner tubular housing that defines a passageway positioned within the outer tubular housing, wherein an end of the passageway is adapted to be operably coupled to an outlet stream of fluidic materials; a plurality of spaced apart baffles positioned within the passageway of the inner tubular housing, wherein each baffle defines at least one passageway; one or more heating elements positioned within the passageway of the inner tubular housing, wherein each heating element extends through a corresponding passageway in each of the baffles; and an annular passageway defined between the inner and outer tubular housings, wherein an inlet of the annular passageway is adapted to be operably coupled to an input stream of fluidic material, and wherein an outlet of the annular passageway is operably coupled to another end of the passageway of the inner tubular housing. In an exemplary embodiment, the outer tubular housing ranges from 4 inch, schedule 40 pipe to 24 inch, schedule 40 pipe; and wherein the inner tubular housing ranges from 3 inch, schedule 10 pipe to 20 inch, schedule 10 pipe. In an exemplary embodiment, the outer tubular housing is fabricated from materials selected from the group consisting of low carbon steel, 304 stainless steel, and 304H stainless steel; and the inner tubular housing is fabricated from materials selected from the group consisting of H grade stainless steel, 316H stainless steel, and chromoly steel. In an exemplary embodiment, the spacing of the baffles in a longitudinal direction within the passageway of the inner tubular housing ranges from about 2 to 60 inches. In an exemplary embodiment, the spacing of the baffles in a longitudinal direction within the passageway of the inner tubular housing is about equal to the internal diameter of the inner tubular housing. In an exemplary embodiment, the internal diameters of the passageways of the baffles are greater than the external diameters of the corresponding heating elements. In an exemplary embodiment, the internal diameters of the passageways of the baffles are at least about 10% greater than the external diameters of the corresponding heating elements. In an exemplary embodiment, the number of heating elements ranges from about 3 to 180. In an exemplary embodiment, the average center-to-center spacing of the heating elements ranges from about 1 to 5 inches. In an exemplary embodiment, the outside diameter of the heating tubes are about 0.475 inches and the inside diameters of the passages, 214a and 216a, through the baffles, 214 and 216, are about $1/16^{th}$ to about $1/4^{th}$ of an inch larger.

A method for conditioning feed gas has been described that includes feeding an inlet stream of gas into an outer passageway in a first direction; then feeding the inlet stream of gas into an inner passageway in a second direction, in opposition to the first direction; heating the inlet stream of gas within the inner passageway; and impeding the flow of the inlet stream of gas within the inner passageway. In an exemplary embodiment, the method further includes heating the inlet stream of gas within the outer passageway. In an exemplary embodiment, the method further includes heating the inlet stream of gas within the outer passageway by transmitting heat from the inlet stream of gas within the inner passageway. In an exemplary embodiment, heating the inlet stream of gas within the inner passageway includes positioning a plurality of heating elements within the inner passageway. In an exemplary embodiment, impeding the flow of the inlet stream of gas within the inner passageway includes constricting the flow of the inlet stream of gas proximate the heating elements within the inner passageway. In an exemplary embodiment, impeding the flow of the inlet stream of gas within the inner passageway includes constricting the flow of the inlet stream of gas within the inner passageway.

An apparatus for conditioning feed gas has been described that includes an outer tubular housing adapted to be operably coupled to an inlet stream of fluidic materials that defines an interior chamber; means for removing particles from the fluidic materials within the interior chamber of the outer tubular housing; means for removing liquids and particles from the fluidic materials operably coupled to and positioned outside of the outer tubular housing; a first inner tubular housing that defines a passageway at least partially positioned within the outer tubular housing, wherein an end of the passageway is operably coupled to the means for removing liquids and particles, and wherein another end of the passageway is adapted to be operably coupled to an outlet stream of fluidic materials; one or more heating elements positioned within the passageway of the inner tubular housing; and a controller operably coupled to the heating elements for monitoring and controlling the operation of the heating elements. In an exemplary embodiment, the apparatus further comprises a second inner tubular housing that defines a passageway at least partially positioned within the outer tubular housing, wherein an end of the passageway is operably coupled to the inlet stream of fluidic materials, wherein another end of the passageway is operably coupled to the interior chamber of the outer tubular housing; and one or more heating elements positioned within the passageway of the second inner tubular housing. In an exemplary embodiment, the apparatus further comprises a third inner tubular housing that defines a passageway at least partially positioned within the outer tubular housing and receives at least a portion of the second inner tubular housing, wherein an annular passageway is defined between the second and third tubular housings, wherein an end of the annular passageway is operably coupled to the passageway of the second tubular housing, and wherein another end of the annular passageway is operably coupled to the interior chamber of the outer tubular housing. In an exemplary embodiment, the apparatus further comprises means for reducing the operating pressure of fluidic materials operably coupled between the passageway of the second tubular housing and the annular passageway. In an exemplary embodiment, the apparatus further comprises one or more baffles positioned within the first inner tubular housing that each define one or more passages for receiving corresponding heating elements. In an exemplary embodiment, the apparatus further comprises one or more baffles positioned within the second inner tubular housing that each define one or more passages for receiving corresponding heating elements. In an exemplary embodiment, the apparatus further comprises one or more baffles positioned within the first inner tubular housing that each define one or more passages for receiving corresponding heating elements; and one or more baffles positioned within the second inner tubular housing that each define one or more passages for receiving corresponding heating elements. In an exemplary embodiment, the outlet stream of fluidic materials comprises a feed stream for combustion within a gas turbine.

A method for conditioning feed gas has been described that includes removing aerosol particles from an inlet stream of fluidic materials; intercepting and coalescing liquids particles within the inlet stream; heating the inlet stream; and exhausting the inlet stream into an outlet stream for use as a feed gas. In an exemplary embodiment, heating the inlet stream comprises impeding the flow of the inlet stream. In an exemplary embodiment, the method further includes heating the inlet stream by flowing the inlet stream in a first direction in a first passageway; and then heating the inlet stream by flowing the inlet stream in a second direction in a second passageway, wherein the second direction is different from the first direction. In an exemplary embodiment, the first direction is opposite from the second direction. In an exemplary embodiment, the second passageway comprises an annular passageway. In an exemplary embodiment, the second passageway at least partially surrounds the first passageway. In an exemplary embodiment, the method further comprises reducing the operating pressure of the inlet stream after heating the inlet stream by flowing the inlet stream in the first direction in the first passageway. In an exemplary embodiment, the method further comprises impeding the flow of the inlet stream of gas within the first passageway. In an exemplary embodiment, heating the inlet stream comprises heating the inlet stream within a third passageway. In an exemplary embodiment, heating the inlet stream comprises impeding the flow of the inlet stream within the third passageway. In an exemplary embodiment, the method further comprises heating the inlet stream by flowing the inlet stream in a first direction in a first passageway; then heating the inlet stream by flowing the inlet stream in a second direction in a second passageway, wherein the second direction is different from the first direction; and then heating the inlet stream by flowing the inlet stream within a third passageway. In an exemplary embodiment, the method further comprises impeding the flow of the inlet stream in an least one of the first and second passageways.

A system for conditioning feed gas has been described that includes means for removing aerosol particles from an inlet stream of fluidic materials; means for intercepting and coalescing liquids particles within the inlet stream; means for heating the inlet stream; and means for exhausting the inlet stream into an outlet stream for use as a feed gas. In an exemplary embodiment, wherein the means for heating the inlet stream comprises means for impeding the flow of the inlet stream. In an exemplary embodiment, the system further comprises means for heating the inlet stream by flowing the inlet stream in a first direction in a first passageway; and means for then heating the inlet stream by flowing the inlet stream in a second direction in a second passageway, wherein the second direction is different from the first direction. In an exemplary embodiment, wherein the first direction is opposite from the second direction. In an exemplary embodiment, the second passageway comprises an annular passageway. In an exemplary embodiment, the second passageway at least partially surrounds the first passageway. In an exemplary embodiment, the system further comprises means for reducing the operating pressure of the inlet stream after heating the inlet stream by flowing the inlet stream in the first direction in the first passageway. In an exemplary embodiment, the system further comprises means for impeding the flow of the inlet stream of gas within the first passageway. In an exemplary embodiment, the means for heating the inlet stream comprises means for heating the inlet stream within a third passageway. In an exemplary embodiment, the means for heating the inlet stream comprises means for impeding the flow of the inlet stream within the third passageway. In an exemplary embodiment, the system further comprises means for heating the inlet stream by flowing the inlet stream in a first direction in a first passageway; means for then heating the inlet stream by flowing the inlet stream in a second direction in a second passageway, wherein the second direction is different from the first direction; and means for then heating the inlet stream by flowing the inlet stream within a third passageway. In an exemplary embodiment, the system further comprises means for impeding the flow of the inlet stream in an least one of the first and second passageways.

An apparatus for conditioning feed gas has been described that includes an outer tubular housing adapted to be operably coupled to an inlet stream of fluidic materials that defines an interior chamber; means for removing particles from the fluidic materials within the interior chamber of the outer tubular housing; means for removing liquids and particles from the fluidic materials operably coupled to and positioned outside of the outer tubular housing; an inner tubular housing that defines a passageway at least partially positioned within the outer tubular housing, wherein an end of the passageway is operably coupled to the means for removing liquids and particles, and wherein another end of the passageway is adapted to be operably coupled to an outlet stream of fluidic materials; one or more heating elements positioned within the passageway of the inner tubular housing; and a controller operably coupled to the heating elements for monitoring and controlling the operation of the heating elements. In an exemplary embodiment, the apparatus further includes one or more baffles positioned within the first inner tubular housing that each define one or more passages for receiving corresponding heating elements. In an exemplary embodiment, the outlet stream of fluidic materials comprises a feed stream for combustion within a gas turbine. In an exemplary embodiment, an operating pressure of the inlet stream of fluidic materials ranges from about 100 to 960 psig; and an operating temperature of the inlet stream of fluidic materials ranges from about 50 to 110° F. In an exemplary embodiment, an operating temperature of the fluidic materials at the other end of the passageway of the inner tubular housing ranges from about 80 to 160° F. In an exemplary embodiment, an operating temperature of the inlet stream of fluidic materials ranges from about 50 to 110° F.; and wherein an operating temperature of the fluidic materials at the other end of the passageway of the inner tubular housing ranges from about 80 to 160° F. In an exemplary embodiment, a power input to the heating elements ranges from about 13 to 1152 KW. In an exemplary embodiment, a mass flow rate of the fluidic materials ranges from about 2841 to 131000 lb/hr.

A method for conditioning feed gas has been described that includes removing aerosol particles from an inlet stream of fluidic materials; intercepting and coalescing liquids particles within the inlet stream; heating the inlet stream within a passageway; and exhausting the inlet stream into an outlet stream for use as a feed gas. In an exemplary embodiment, heating the inlet stream comprises impeding the flow of the inlet stream within the passageway. In an exemplary embodiment, removing aerosol particles from an inlet stream of fluidic materials comprises removing aerosol particle from the inlet stream within another passageway. In an exemplary embodiment, the other passageway surrounds the passageway. In an exemplary embodiment, intercepting and coalescing liquids particles within the inlet stream comprises intercepting and coalescing liquids particles within the inlet stream within another passageway. In an exemplary embodiment, an operating pressure of the inlet stream of fluidic materials ranges from about 100 to 960 psig; and an operating temperature of the inlet stream of fluidic materials ranges from about 50 to 110° F. In an exemplary embodiment, heating the inlet stream within the passageway comprises heating the inlet stream to an operating temperature that ranges from about 80 to 160° F. In an exemplary embodiment, an operating temperature of the inlet stream of fluidic materials ranges from about 50 to 110° F.; and wherein heating the inlet stream within the passageway comprises heating the inlet stream to an operating temperature that ranges from about 80 to 160° F. In an exemplary embodiment, heating the inlet stream within the passageway comprises inputting power into the fluidic materials that ranges from about 13 to 1152 KW. In an exemplary embodiment, a mass flow rate of the fluidic materials ranges from about 2841 to 131000 lb/hr. In an exemplary embodiment, heating the inlet stream within the passageway comprises inputting power into the fluidic materials that ranges from about 13 to 1152 KW. In an exemplary embodiment, an operating pressure of the inlet stream of fluidic materials ranges from about 100 to 960 psig; and wherein an operating temperature of the inlet stream of fluidic materials ranges from about 50 to 110° F.

A system for conditioning feed gas has been described that includes means for removing aerosol particles from an inlet stream of fluidic materials; means for intercepting and coalescing liquids particles within the inlet stream; means for heating the inlet stream within a passageway; and means for exhausting the inlet stream into an outlet stream for use as a feed gas. In an exemplary embodiment, means for heating the inlet stream comprises means for impeding the flow of the inlet stream within the passageway. In an exemplary embodiment, means for removing aerosol particles from an inlet stream of fluidic materials comprises means for removing aerosol particle from the inlet stream within another passageway. In an exemplary embodiment, the other passageway surrounds the passageway. In an exemplary embodiment, means for intercepting and coalescing liquids particles within the inlet stream comprises means for intercepting and coalescing liquids particles within the inlet stream within another passageway. In an exemplary embodiment, an operating pressure of the inlet stream of fluidic materials ranges from about 100 to 960 psig; and an operating temperature of the inlet stream of fluidic materials ranges from about 50 to 110° F. In an exemplary embodiment, means for heating the inlet stream within the passageway comprises means for heating the inlet stream to an operating temperature that ranges from about 80 to 160° F. In an exemplary embodiment, an operating temperature of the inlet stream of fluidic materials ranges from about 50 to 110° F.; and heating the inlet stream within the passageway comprises heating the inlet stream to an operating temperature that ranges from about 80 to 160° F. In an exemplary embodiment, means for heating the inlet stream within the passageway comprises means for inputting power into the fluidic materials that ranges from about 13 to 1152 KW. In an exemplary embodiment, a mass flow rate of the fluidic materials ranges from about 2841 to 131000 lb/hr. In an exemplary embodiment, means for heating the inlet stream within the passageway comprises means for inputting power into the fluidic materials that ranges from about 13 to 1152 KW. In an exemplary embodiment, an operating pressure of the inlet stream of fluidic materials ranges from about 100 to 960 psig; and wherein an operating temperature of the inlet stream of fluidic materials ranges from about 50 to 110° F.

An apparatus for conditioning feed gas has been described that includes a cross heat exchanger adapted to be operably coupled to an inlet stream of fluidic materials, the cross heat exchanger comprising a housing defining a first flow passage in a first direction and second flow passage in a second direction and heating elements positioned within the first flow passage for heating fluidic materials therein; means for removing particles from the fluidic materials operably coupled to the cross heat exchanger; and a controller operably coupled to the cross heat exchanger for monitoring and controlling the operation of the cross heat exchanger. In an exemplary embodiment, the apparatus further includes a heating assembly operably coupled to the means for removing particles from the fluidic materials comprising a housing that defines a passageway and heating elements positioned within the housing operably coupled to the controller for heating fluidic materials therein. In an exemplary embodiment, the apparatus further includes means for reducing the operating pressure of fluidic materials operably coupled between the first and second passageways of the cross heat exchanger. In an exemplary embodiment, the apparatus further includes one or more baffles positioned within the first passageway of the housing of the cross heat exchanger that each define one or more passages for receiving corresponding heating elements. In an exemplary embodiment, the apparatus further includes one or more baffles positioned within the passageway of the housing of the heating assembly that each define one or more passages for receiving corresponding heating elements. In an exemplary embodiment, the outlet stream of fluidic materials comprises a feed stream for combustion within a gas turbine. In an exemplary embodiment, the apparatus provides a stage of separation of greater than one.

A method for conditioning feed gas has been described that includes removing aerosol particles from an inlet stream of fluidic materials; intercepting and coalescing liquids particles within the inlet stream; heating the inlet stream in a first direction and then in a second direction opposite the first direction in a cross heat exchanger; and exhausting the inlet stream into an outlet stream for use as a feed gas. In an exemplary embodiment, heating the inlet stream in the first direction comprises impeding the flow of the inlet stream. In an exemplary embodiment, the second passageway comprises an annular passageway. In an exemplary embodiment, the second passageway at least partially surrounds the first passageway. In an exemplary embodiment, the method further includes reducing the operating pressure of the inlet stream between heating the inlet stream in the first direction and then in the second direction. In an exemplary embodiment, the method further includes heating the inlet stream within a third passageway. In an exemplary embodiment, heating the inlet stream within the third passageway comprises impeding the flow of the inlet stream within the third passageway. In an exemplary embodiment, the method provides a stage of separation of greater than one.

A system for conditioning feed gas has been described that includes means for removing aerosol particles from an inlet stream of fluidic materials; means for intercepting and coalescing liquids particles within the inlet stream; means for heating the inlet stream in a first direction and then in a second direction opposite the first direction; and means for exhausting the inlet stream into an outlet stream for use as a feed gas. In an exemplary embodiment, means for heating the inlet stream in the first direction comprises means for impeding the flow of the inlet stream. In an exemplary embodiment, the second passageway comprises an annular passageway. In an exemplary embodiment, the second passageway at least partially surrounds the first passageway. In an exemplary embodiment, the system further includes means for reducing the operating pressure of the inlet stream between means for heating the inlet stream in the first direction and then in the second direction. In an exemplary embodiment, the system further includes means for heating the inlet stream within a third passageway. In an exemplary embodiment, means for heating the inlet stream within the third passageway comprises means for impeding the flow of the inlet stream within the third passageway. In an exemplary embodiment, the method provides a stage of separation of greater than one.

It is understood that variations may be made in the above without departing from the scope of the invention. For example, one or more elements of the exemplary embodiments may be combined, in whole or in part, with one or more elements of one or more of the other exemplary embodiments. In addition, one or more elements of one or more of the exemplary embodiments may be omitted or substituted with equivalent elements or other elements of one or more of the other exemplary embodiments. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A system for conditioning feed gas, comprising:
   means for removing aerosol particles from an inlet stream of fluidic materials;
   means for intercepting and coalescing liquids particles within the inlet stream;
   means for heating the inlet stream in a first direction and then in a second direction opposite the first direction;
   means for reducing the operating pressure of the inlet stream between means for heating the inlet stream in the first direction and then in the second direction; and
   means for exhausting the inlet stream into an outlet stream for use as a feed gas.

2. The system of claim 1, wherein means for heating the inlet stream in the first direction comprises means for impeding the flow of the inlet stream.

3. The system of claim 1, wherein the means for heating the inlet stream in a second direction comprises a first annular passageway.

4. The system of claim 3, wherein the means for heating the inlet stream in a first direction comprises a second passageway, the second passageway at least partially surrounding the first annular passageway.

5. The system of claim 1, further comprising means for heating the inlet stream within a third passageway.

6. The system of claim 5, wherein means for heating the inlet stream within the third passageway comprises means for impeding the flow of the inlet stream within the third passageway.

* * * * *